United States Patent
Cho et al.

(10) Patent No.: US 8,050,355 B2
(45) Date of Patent: Nov. 1, 2011

(54) TRANSMITTER AND RECEIVER USING PSEUDO-ORTHOGONAL CODE

(75) Inventors: Jin Woong Cho, Gyeonggi-do (KR); Yong Seong Kim, Gyeonggi-do (KR); Do Hun Kim, Gyeonggi-do (KR); Sun Hee Kim, Gyeonggi-do (KR); Dae Ki Hong, Chungcheongnam-do (KR)

(73) Assignee: Korea Electronics Technology Institute, Gyeonggi-do (KR)

( * ) Notice: Subject to any disclaimer, the term of this patent is extended or adjusted under 35 U.S.C. 154(b) by 718 days.

(21) Appl. No.: 12/136,800

(22) Filed: Jun. 11, 2008

(65) Prior Publication Data

US 2009/0310706 A1    Dec. 17, 2009

(51) Int. Cl.
*H04L 27/36* (2006.01)

(52) U.S. Cl. ........ 375/298; 375/295; 375/343; 375/372; 711/217; 711/1; 711/127; 380/29

(58) Field of Classification Search .......... 375/298, 375/295, 343, 372; 711/217, 1, 127; 380/29
See application file for complete search history.

(56) References Cited

U.S. PATENT DOCUMENTS

| | | | | |
|---|---|---|---|---|
| 5,642,365 A | * | 6/1997 | Murakami et al. | 714/761 |
| 5,844,611 A | * | 12/1998 | Hamano et al. | 375/240.2 |
| 5,920,591 A | * | 7/1999 | Fukasawa et al. | 375/142 |
| 6,466,564 B1 | * | 10/2002 | Rakib et al. | 370/342 |
| 6,496,747 B1 | * | 12/2002 | Suzuki | 700/102 |
| 6,647,059 B1 | * | 11/2003 | Faruque | 375/222 |
| 7,031,369 B2 | * | 4/2006 | Kurabe et al. | 375/140 |
| 7,301,985 B1 | * | 11/2007 | Hall et al. | 375/130 |
| 7,944,374 B1 | * | 5/2011 | Kim et al. | 341/50 |
| 2001/0021169 A1 | * | 9/2001 | Kim | 370/209 |
| 2002/0035715 A1 | * | 3/2002 | Hatakeyama | 714/788 |

* cited by examiner

*Primary Examiner* — Kenneth Lam
(74) *Attorney, Agent, or Firm* — Edell, Shapiro & Finnan, LLC

(57) ABSTRACT

A transmitter using pseudo-orthogonal code includes a serial-to-parallel converter for converting serial transmission data into 9-bit parallel data, and a pseudo-orthogonal code memory for receiving the parallel data from the serial-to-parallel converter and outputting 16-bit pseudo-orthogonal code by using the received data as addresses. The pseudo-orthogonal code memory has the relationship of the input address and output code, as expressed in the following equation:

$$c(i)=0.5\times((-1)^{b_2\oplus(i_1\wedge b_1)\oplus(i_0\wedge b_0)}$$

$$(-1)^{b_5\oplus i_2\oplus(i_1\wedge b_4)\oplus(i_0\wedge b_3)}$$

$$(-1)^{b_8\oplus i_3\oplus(i_1\wedge b_7)\oplus(i_0\wedge b_6)}$$

$$(-1)^{\overline{(b_2\oplus b_5\oplus b_8)}\oplus i_3\oplus i_2\oplus(i_1\wedge(b_1\oplus b_4\oplus b_7))\oplus(i_0\wedge(b_0\oplus b_3\oplus b_6))})$$

where C(i) is a pseudo-orthogonal code value, i is each bit of the pseudo-orthogonal code, $0\leq i\leq 15$, and $b_0$-$b_8$ are a transmission data bit stream input in the memory as addresses. Accordingly, the transmission efficiency of the transmitter/receiver using orthogonal code can be remarkably improved.

4 Claims, 6 Drawing Sheets

| DATA BIT | ORTHOGONAL CODE | | | | | | | | | | | | | | | |
|---|---|---|---|---|---|---|---|---|---|---|---|---|---|---|---|---|
| 0000 | 0 | 0 | 0 | 0 | 0 | 0 | 0 | 0 | 0 | 0 | 0 | 0 | 0 | 0 | 0 | 0 |
| 0001 | 0 | 1 | 0 | 1 | 0 | 1 | 0 | 1 | 0 | 1 | 0 | 1 | 0 | 1 | 0 | 1 |
| 0010 | 0 | 0 | 1 | 1 | 0 | 0 | 1 | 1 | 0 | 0 | 1 | 1 | 0 | 0 | 1 | 1 |
| 0011 | 0 | 1 | 1 | 0 | 0 | 1 | 1 | 0 | 0 | 1 | 1 | 0 | 0 | 1 | 1 | 0 |
| 0100 | 0 | 0 | 0 | 0 | 1 | 1 | 1 | 1 | 0 | 0 | 0 | 0 | 1 | 1 | 1 | 1 |
| 0101 | 0 | 1 | 0 | 1 | 1 | 0 | 1 | 0 | 0 | 1 | 0 | 1 | 1 | 0 | 1 | 0 |
| 0110 | 0 | 0 | 1 | 1 | 1 | 1 | 0 | 0 | 0 | 0 | 1 | 1 | 1 | 1 | 0 | 0 |
| 0111 | 0 | 1 | 1 | 0 | 1 | 0 | 0 | 1 | 0 | 1 | 1 | 0 | 1 | 0 | 0 | 1 |
| 1000 | 0 | 0 | 0 | 0 | 0 | 0 | 0 | 0 | 1 | 1 | 1 | 1 | 1 | 1 | 1 | 1 |
| 1001 | 0 | 1 | 0 | 1 | 0 | 1 | 0 | 1 | 1 | 0 | 1 | 0 | 1 | 0 | 1 | 0 |
| 1010 | 0 | 0 | 1 | 1 | 0 | 0 | 1 | 1 | 1 | 1 | 0 | 0 | 1 | 1 | 0 | 0 |
| 1011 | 0 | 1 | 1 | 0 | 0 | 1 | 1 | 0 | 1 | 0 | 0 | 1 | 1 | 0 | 0 | 1 |
| 1100 | 0 | 0 | 0 | 0 | 1 | 1 | 1 | 1 | 1 | 1 | 1 | 1 | 0 | 0 | 0 | 0 |
| 1101 | 0 | 1 | 0 | 1 | 1 | 0 | 1 | 0 | 1 | 0 | 1 | 0 | 0 | 1 | 0 | 1 |
| 1110 | 0 | 0 | 1 | 1 | 1 | 1 | 0 | 0 | 1 | 1 | 0 | 0 | 0 | 0 | 1 | 1 |
| 1111 | 0 | 1 | 1 | 0 | 1 | 0 | 0 | 1 | 1 | 0 | 0 | 1 | 0 | 1 | 1 | 0 |

| CORRELATION VALUE *16 | 16 | 8 | 4 | 0 | -4 | -8 | -16 |
|---|---|---|---|---|---|---|---|
| NUMBER | 1 | 36 | 96 | 246 | 96 | 36 | 1 |

FIG. 3

| MODULATION SCHEME | CHANNEL CODING |
|---|---|
| QPSK | 8-state TCM |
| DQPSK | none |
| 16QAM | 8-state TCM |
| 32QAM | 8-state TCM |
| 64QAM | 8-state TCM |

TRANSMITTER AND RECEIVER USING PSEUDO-ORTHOGONAL CODE

FIELD OF THE INVENTION

The present disclosure relates to a wireless transmitter and receiver using orthogonal code, and more particularly, to a pseudo-orthogonal transmitter and receiver, which have higher spectrum efficiency than a typical orthogonal coding scheme.

BACKGROUND

A typical orthogonal code table is shown in FIG. 1. A related art orthogonal encoder receives a total of four bits, and the number of cases of bit streams is 16 ($=2^4$). Generally, orthogonal codes having 16 codes must be 16 bits in length. An example of Walsh orthogonal codes is illustrated in FIG. 1.

It is important in the orthogonal code that columns of the Walsh codes are orthogonal to each other. For example, a cross-correlation value between the first Walsh code "0000000000000000" and the second Walsh code "0101010101010101" becomes zero, as expressed in the following Equation. This means that two codes are orthogonal to each other.

$$c = \frac{1}{16}\sum_{i=0}^{15}(2*CODE1d_i - 1) \times (2*CODE2d_i - 1) = 0$$

An auto-correlation value calculated using the first Walsh code becomes "1", as expressed in the following Equation.

$$c = \frac{1}{16}\sum_{i=0}^{15}(2*CODE1d_i - 1) \times (2*CODE1d_i - 1) = 1$$

Since a related art orthogonal coding scheme needs 16 code bits in order to transmit a total of 4 data bits, its spectrum efficiency is 0.25. Generally, an orthogonal modulation system exhibits good performance in a situation where interference is generated by a diffusion effect. Such a scheme is used in Interim Standard (IS)-95, which is one of cellular communication standards.

However, such a system has very low spectrum efficiency, causing channel waste. Therefore, there is a need to develop a new orthogonal code modulation scheme that has high spectrum efficiency and is robust against interference.

SUMMARY

Therefore, an object of the present invention is to provide a transmitter and receiver that obtain pseudo-orthogonal code using a coding scheme different from an existing orthogonal scheme, so that much more data bits can be transmitted while using a code having the same length as an existing orthogonal code and obtaining frequency spread characteristic, thereby increasing spectrum efficiency.

To achieve these and other advantages and in accordance with the purpose(s) of the present invention as embodied and broadly described herein, a transmitter using pseudo-orthogonal code in accordance with an aspect of the present invention includes: a serial-to-parallel converter for converting serial transmission data into 9-bit parallel data; and a pseudo-orthogonal code memory for receiving the parallel data from the serial-to-parallel converter and outputting 16-bit pseudo-orthogonal code by using the received data as addresses, wherein the pseudo-orthogonal code memory has the relationship of the input address and output code, as expressed in the following equation:

$$c(i) = 0.5 \times ((-1)^{b_2 \oplus (i_1 \wedge b_1) \oplus (i_0 \wedge b_0)}$$

$$(-1)^{b_5 \oplus i_2 \oplus (i_1 \wedge b_4) \oplus (i_0 \wedge b_3)}$$

$$(-1)^{b_8 \oplus i_3 \oplus (i_1 \wedge b_7) \oplus (i_0 \wedge b_6)}$$

$$(-1)^{\overline{(b_2 \oplus b_5 \oplus b_8) \oplus i_3 \oplus i_2 \oplus (i_1 \wedge (b_1 \oplus b_4 \oplus b_7)) \oplus (i_0 \wedge (b_0 \oplus b_3 \oplus b_6))}})$$

where C(i) is a pseudo-orthogonal code value, i is each bit of the pseudo-orthogonal code, $0 \leq i \leq 15$, and $b_0$-$b_8$ are a transmission data bit stream input in the memory as addresses.

The transmitter may further include an encryption block for encrypting the output of the pseudo-orthogonal code memory.

The transmitter may further include an encryption block for encrypting the output of the serial-to-parallel converter.

To achieve these and other advantages and in accordance with the purpose(s) of the present invention, a receiver using pseudo-orthogonal code in accordance with another aspect of the present invention includes: a memory for storing 512 16-bit pseudo-orthogonal codes; a divider for dividing channel-decoded reception signals on the 16-bit basis; 512 correlators each for receiving 16-bit data from the divider and one of the 512 16-bit pseudo-orthogonal codes, the 512 correlators having respective indexes; and a maximum value selector connected to the correlators to select a maximum value among the output values of the correlators.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 3 is a table showing correlation characteristic of pseudo-orthogonal codes according to an embodiment of the present invention;

DETAILED DESCRIPTION

Hereinafter, specific embodiments will be described in detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

An aim of the present invention is to design a system that can use a code bit having the same length as an orthogonal code by using a pseudo-orthogonal code, instead of a typical orthogonal code, obtain frequency spread characteristic, and transmit much more data.

Specifically, spectrum efficiency that has been 0.25 in the related art is remarkably improved by converting 9-bit data bit into 16-bit pseudo-orthogonal code that has the same bit number as the related art orthogonal code.

For explanation of the system, 9-bit input bit, that is, transmission data bit stream is expressed as follows:

$$b = (b_8, b_7, b_6, b_5, b_4, b_3, b_2, b_1, b_0)$$

It is assumed that a binary representation of a time index $i (0 \leq i \leq 15)$ of 16-bit output bit is as follows:

$$i = (i_3, i_2, i_1, i_0)$$

For example, when the sixth output bit is expressed as $i = 5 = (i_3, i_2, i_1, i_0) = (0, 1, 0, 1)$. In this case, generation of the pseudo-orthogonal code is expressed as the following Equation (1):

$$c(i) = 0.5 \times ((-1)^{b_2 \oplus (i_1 \wedge b_1) \oplus (i_0 \wedge b_0)}$$

$$(-1)^{b_5 \oplus i_2 \oplus (i_1 \wedge b_4) \oplus (i_0 \wedge b_3)}$$

$$(-1)^{b_8 \oplus i_3 \oplus (i_1 \wedge b_7) \oplus (i_0 \wedge b_6)}$$

$$(-1)^{\overline{(b_2 \oplus b_5 \oplus b_8)} \oplus i_3 \oplus i_2 \oplus (i_1 \wedge (b_1 \oplus b_4 \oplus b_7)) \oplus (i_0 \wedge (b_0 \oplus b_3 \oplus b_6))}) \qquad (1)$$

In the above Equation 1, since the number of input bits is 9, a total of 512 ($=2^9$) codes are generated.

That is, a total bit number of the generated code is 16, and the number of cases is 512. One of 512 code sequences having a length of 16 bits is selected according to the type of the input bit.

Therefore, since a pseudo-orthogonal code system needs 16 bits in order to transmit a total of 9 bits, its spectrum efficiency is 0.5625. Compared with the orthogonal code, the spectrum efficiency is improved by 225%.

Figures 1, 2:
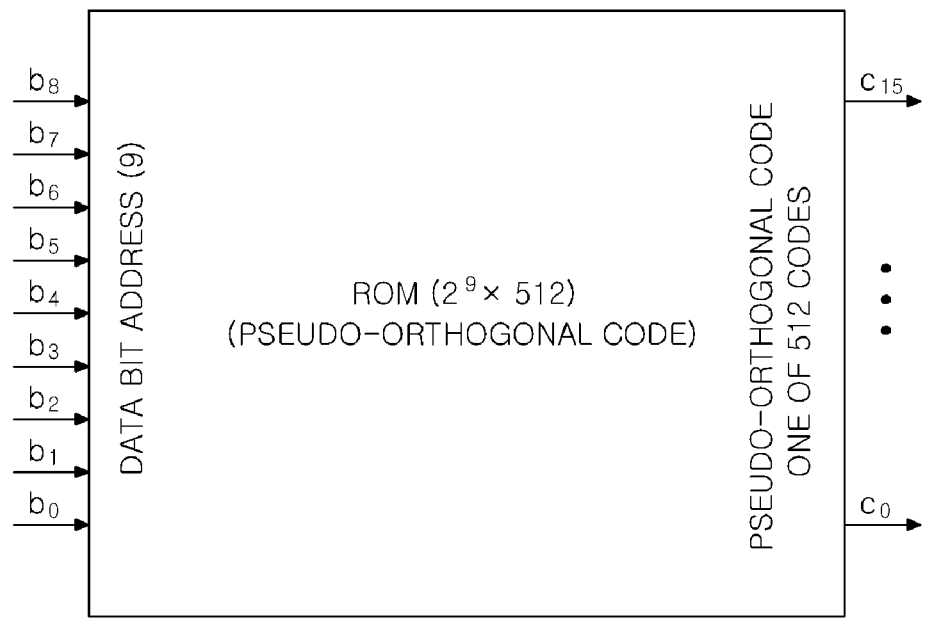
FIG. 1 illustrates a relationship between a related art Walsh orthogonal code and data bit.
FIG. 2 is a block diagram of a pseudo-orthogonal encoder according to an embodiment of the present invention.

FIG. 2 is a block diagram of a pseudo-orthogonal encoder. As illustrated in FIG. 2, a ROM may be used as the pseudo-orthogonal encoder of the present invention. The ROM stores 512 16-bit pseudo-orthogonal codes, and the ROM has 9 address pins through which data bits to be transmitted are input. One of 512 pseudo-orthogonal codes is selected and output. This is the pseudo-orthogonal coding process. The size of the ROM is $2^9 \times 512$.

The expression of all pseudo-orthogonal codes is shown in Table 1, and the correlation characteristic of the pseudo-orthogonal codes is shown in FIG. 3. Due to the correlation characteristic of FIG. 3, the performance of the system is relatively lowered by the orthogonal modulation, but its spectrum efficiency is greatly increased.

TABLE 1

| INDEX | CODE | | | | | | | | | | | | | | | |
|---|---|---|---|---|---|---|---|---|---|---|---|---|---|---|---|---|
| 1  | 1  | 1  | 1  | 1  | 1  | 1  | 1  | 1  | 1  | 1  | 1  | -1 | -1 | -1 | -1 | -1 |
| 2  | 1  | 1  | 1  | 1  | 1  | -1 | 1  | -1 | 1  | -1 | 1  | -1 | -1 | -1 | -1 | -1 |
| 3  | 1  | 1  | 1  | 1  | 1  | 1  | -1 | -1 | 1  | 1  | -1 | -1 | -1 | -1 | -1 | -1 |
| 4  | 1  | 1  | 1  | 1  | -1 | -1 | 1  | 1  | -1 | -1 | 1  | -1 | -1 | -1 | -1 | -1 |
| 5  | 1  | 1  | 1  | 1  | -1 | -1 | -1 | -1 | -1 | -1 | -1 | -1 | -1 | -1 | -1 | -1 |
| 6  | 1  | 1  | 1  | 1  | -1 | 1  | -1 | 1  | -1 | 1  | -1 | 1  | -1 | -1 | -1 | -1 |
| 7  | 1  | 1  | 1  | 1  | -1 | -1 | 1  | 1  | -1 | -1 | 1  | 1  | -1 | -1 | -1 | -1 |
| 8  | 1  | 1  | 1  | 1  | -1 | 1  | 1  | -1 | -1 | 1  | 1  | -1 | -1 | -1 | -1 | -1 |
| 9  | 1  | 1  | 1  | 1  | 1  | 1  | 1  | 1  | -1 | 1  | -1 | -1 | 1  | -1 | 1  | 1  |
| 10 | 1  | -1 | 1  | -1 | 1  | 1  | 1  | 1  | 1  | -1 | 1  | -1 | -1 | -1 | -1 | -1 |
| 11 | 1  | 1  | 1  | -1 | 1  | 1  | -1 | 1  | -1 | -1 | -1 | -1 | 1  | -1 | 1  | -1 |
| 12 | 1  | -1 | 1  | 1  | 1  | 1  | -1 | 1  | 1  | -1 | -1 | -1 | -1 | -1 | -1 | 1  |
| 13 | 1  | -1 | 1  | -1 | -1 | 1  | -1 | 1  | -1 | -1 | -1 | -1 | -1 | -1 | -1 | -1 |
| 14 | 1  | 1  | 1  | 1  | 1  | 1  | 1  | -1 | -1 | -1 | -1 | -1 | -1 | 1  | 1  | 1  |
| 15 | 1  | -1 | 1  | 1  | -1 | 1  | 1  | 1  | -1 | -1 | 1  | -1 | -1 | -1 | -1 | -1 |
| 16 | 1  | 1  | 1  | -1 | -1 | 1  | 1  | -1 | 1  | -1 | 1  | -1 | 1  | -1 | 1  | -1 |
| 17 | 1  | 1  | 1  | 1  | 1  | 1  | 1  | 1  | 1  | 1  | -1 | -1 | -1 | -1 | 1  | 1  |
| 18 | 1  | 1  | 1  | -1 | 1  | -1 | 1  | 1  | 1  | -1 | -1 | -1 | -1 | -1 | 1  | -1 |
| 19 | 1  | 1  | -1 | -1 | 1  | 1  | 1  | 1  | 1  | 1  | -1 | -1 | -1 | -1 | -1 | -1 |
| 20 | 1  | 1  | -1 | 1  | 1  | -1 | 1  | 1  | 1  | -1 | -1 | -1 | -1 | -1 | -1 | 1  |
| 21 | 1  | 1  | -1 | -1 | -1 | -1 | 1  | 1  | -1 | -1 | -1 | -1 | -1 | -1 | -1 | -1 |
| 22 | 1  | -1 | 1  | -1 | 1  | 1  | 1  | 1  | -1 | 1  | 1  | -1 | -1 | -1 | -1 | 1  |
| 23 | 1  | 1  | 1  | 1  | -1 | -1 | 1  | 1  | -1 | -1 | -1 | -1 | -1 | -1 | -1 | 1  |
| 24 | 1  | 1  | 1  | -1 | -1 | 1  | 1  | -1 | 1  | -1 | 1  | -1 | -1 | -1 | 1  | -1 |
| 25 | 1  | 1  | 1  | 1  | 1  | 1  | 1  | 1  | -1 | -1 | 1  | -1 | 1  | 1  | 1  | -1 |
| 26 | 1  | -1 | 1  | 1  | 1  | 1  | 1  | -1 | 1  | -1 | -1 | -1 | -1 | -1 | 1  | -1 |
| 27 | 1  | 1  | -1 | 1  | 1  | 1  | 1  | -1 | 1  | -1 | -1 | -1 | -1 | -1 | 1  | -1 |
| 28 | 1  | -1 | -1 | 1  | 1  | 1  | 1  | 1  | 1  | -1 | -1 | 1  | -1 | -1 | -1 | -1 |
| 29 | 1  | -1 | -1 | 1  | -1 | 1  | -1 | -1 | -1 | -1 | -1 | -1 | -1 | -1 | -1 | -1 |
| 30 | 1  | 1  | -1 | 1  | -1 | 1  | 1  | 1  | -1 | -1 | 1  | -1 | 1  | -1 | -1 | -1 |
| 31 | 1  | -1 | 1  | 1  | -1 | 1  | 1  | -1 | -1 | -1 | 1  | -1 | 1  | -1 | -1 | -1 |
| 32 | 1  | 1  | 1  | 1  | -1 | 1  | 1  | -1 | -1 | -1 | -1 | -1 | -1 | 1  | 1  | -1 |
| 33 | 1  | 1  | 1  | 1  | 1  | 1  | 1  | 1  | -1 | -1 | -1 | -1 | 1  | 1  | 1  | 1  |
| 34 | 1  | -1 | 1  | -1 | 1  | 1  | 1  | -1 | -1 | -1 | -1 | 1  | -1 | 1  | -1 | -1 |
| 35 | 1  | 1  | -1 | -1 | 1  | 1  | 1  | -1 | -1 | -1 | -1 | 1  | 1  | -1 | -1 | -1 |
| 36 | 1  | -1 | -1 | 1  | 1  | 1  | 1  | -1 | -1 | -1 | -1 | 1  | -1 | -1 | -1 | 1  |
| 37 | -1 | -1 | -1 | -1 | 1  | 1  | 1  | -1 | -1 | -1 | -1 | -1 | -1 | -1 | -1 | -1 |
| 38 | -1 | 1  | -1 | 1  | 1  | 1  | 1  | -1 | -1 | -1 | -1 | 1  | 1  | -1 | 1  | 1  |
| 39 | -1 | -1 | 1  | 1  | 1  | 1  | 1  | -1 | -1 | -1 | -1 | -1 | -1 | -1 | 1  | 1  |
| 40 | -1 | 1  | 1  | -1 | 1  | 1  | 1  | -1 | -1 | -1 | -1 | -1 | 1  | 1  | -1 | 1  |
| 41 | 1  | 1  | 1  | 1  | 1  | 1  | 1  | 1  | 1  | -1 | 1  | -1 | 1  | -1 | -1 | -1 |
| 42 | 1  | 1  | 1  | 1  | 1  | -1 | 1  | -1 | -1 | -1 | -1 | 1  | -1 | 1  | -1 | -1 |

TABLE 1-continued

| INDEX | CODE | | | | | | | | | | | | | | | |
|---|---|---|---|---|---|---|---|---|---|---|---|---|---|---|---|---|
| 43 | 1 | 1 | −1 | 1 | 1 | 1 | 1 | −1 | −1 | 1 | −1 | −1 | 1 | −1 | −1 | −1 |
| 44 | 1 | 1 | −1 | 1 | 1 | −1 | 1 | 1 | −1 | 1 | 1 | 1 | 1 | −1 | −1 | −1 |
| 45 | −1 | 1 | −1 | 1 | 1 | −1 | 1 | −1 | −1 | −1 | −1 | −1 | −1 | −1 | −1 | −1 |
| 46 | −1 | 1 | −1 | 1 | 1 | 1 | 1 | 1 | −1 | 1 | −1 | 1 | −1 | −1 | −1 | −1 |
| 47 | −1 | 1 | 1 | 1 | 1 | −1 | 1 | 1 | −1 | −1 | 1 | −1 | −1 | −1 | 1 | −1 |
| 48 | −1 | 1 | 1 | 1 | 1 | 1 | 1 | −1 | −1 | 1 | −1 | −1 | −1 | −1 | 1 | −1 |
| 49 | 1 | 1 | 1 | 1 | 1 | 1 | 1 | 1 | −1 | 1 | 1 | 1 | 1 | 1 | −1 | −1 |
| 50 | 1 | −1 | 1 | 1 | 1 | 1 | 1 | −1 | −1 | −1 | 1 | −1 | 1 | −1 | −1 | −1 |
| 51 | 1 | 1 | 1 | 1 | 1 | 1 | −1 | −1 | −1 | −1 | −1 | 1 | 1 | −1 | −1 | −1 |
| 52 | 1 | −1 | 1 | 1 | 1 | 1 | −1 | 1 | −1 | −1 | 1 | 1 | 1 | −1 | −1 | −1 |
| 53 | −1 | −1 | 1 | 1 | 1 | 1 | −1 | −1 | −1 | −1 | −1 | −1 | 1 | −1 | −1 | −1 |
| 54 | −1 | 1 | 1 | 1 | 1 | −1 | 1 | −1 | −1 | −1 | 1 | 1 | 1 | −1 | −1 | −1 |
| 55 | −1 | −1 | 1 | 1 | 1 | 1 | 1 | −1 | −1 | 1 | 1 | −1 | −1 | −1 | −1 | −1 |
| 56 | −1 | 1 | 1 | 1 | 1 | 1 | −1 | 1 | −1 | 1 | −1 | 1 | 1 | −1 | −1 | −1 |
| 57 | 1 | 1 | 1 | 1 | 1 | 1 | 1 | 1 | −1 | 1 | 1 | 1 | −1 | −1 | −1 | 1 |
| 58 | 1 | 1 | 1 | −1 | 1 | −1 | 1 | 1 | −1 | −1 | 1 | −1 | 1 | −1 | −1 | −1 |
| 59 | 1 | 1 | 1 | −1 | 1 | 1 | −1 | 1 | −1 | 1 | −1 | −1 | 1 | −1 | −1 | −1 |
| 60 | 1 | 1 | 1 | 1 | 1 | −1 | −1 | 1 | −1 | −1 | −1 | 1 | −1 | −1 | −1 | 1 |
| 61 | −1 | 1 | 1 | −1 | 1 | −1 | −1 | −1 | 1 | −1 | −1 | −1 | −1 | −1 | −1 | −1 |
| 62 | −1 | 1 | 1 | 1 | 1 | −1 | 1 | −1 | 1 | −1 | −1 | −1 | −1 | −1 | −1 | 1 |
| 63 | −1 | 1 | 1 | 1 | −1 | 1 | 1 | −1 | −1 | 1 | −1 | −1 | −1 | −1 | −1 | 1 |
| 64 | −1 | 1 | 1 | −1 | 1 | 1 | 1 | 1 | −1 | 1 | 1 | −1 | −1 | −1 | −1 | −1 |
| 65 | 1 | 1 | 1 | 1 | 1 | 1 | −1 | 1 | 1 | 1 | 1 | 1 | −1 | 1 | −1 | 1 |
| 66 | 1 | −1 | 1 | −1 | 1 | −1 | 1 | −1 | 1 | 1 | 1 | 1 | 1 | −1 | −1 | −1 |
| 67 | 1 | 1 | 1 | −1 | 1 | −1 | −1 | −1 | 1 | 1 | −1 | 1 | 1 | 1 | −1 | 1 |
| 68 | 1 | −1 | 1 | 1 | 1 | −1 | −1 | −1 | 1 | 1 | −1 | 1 | −1 | 1 | −1 | 1 |
| 69 | 1 | −1 | 1 | 1 | −1 | −1 | −1 | −1 | 1 | 1 | 1 | 1 | 1 | 1 | −1 | 1 |
| 70 | 1 | 1 | 1 | 1 | −1 | −1 | −1 | −1 | 1 | −1 | 1 | 1 | 1 | 1 | −1 | 1 |
| 71 | 1 | −1 | 1 | 1 | −1 | 1 | −1 | 1 | −1 | 1 | 1 | −1 | −1 | 1 | −1 | 1 |
| 72 | 1 | 1 | 1 | −1 | −1 | −1 | −1 | 1 | −1 | 1 | 1 | 1 | −1 | 1 | −1 | −1 |
| 73 | 1 | −1 | 1 | −1 | 1 | 1 | 1 | 1 | 1 | 1 | 1 | 1 | 1 | 1 | −1 | 1 |
| 74 | 1 | −1 | 1 | −1 | 1 | −1 | 1 | −1 | 1 | −1 | 1 | −1 | −1 | 1 | 1 | 1 |
| 75 | 1 | −1 | 1 | −1 | 1 | 1 | −1 | 1 | 1 | −1 | 1 | −1 | −1 | 1 | 1 | 1 |
| 76 | 1 | −1 | 1 | −1 | 1 | −1 | −1 | 1 | 1 | −1 | 1 | 1 | 1 | 1 | −1 | 1 |
| 77 | 1 | −1 | 1 | −1 | −1 | −1 | −1 | −1 | 1 | −1 | 1 | −1 | −1 | −1 | 1 | 1 |
| 78 | 1 | −1 | 1 | −1 | −1 | 1 | −1 | 1 | −1 | 1 | −1 | 1 | 1 | 1 | 1 | 1 |
| 79 | 1 | −1 | 1 | −1 | −1 | 1 | 1 | −1 | −1 | 1 | 1 | −1 | 1 | 1 | −1 | 1 |
| 80 | 1 | −1 | 1 | −1 | −1 | 1 | 1 | −1 | −1 | 1 | 1 | −1 | −1 | 1 | −1 | 1 |
| 81 | 1 | 1 | 1 | −1 | 1 | −1 | 1 | 1 | 1 | 1 | −1 | 1 | −1 | 1 | 1 | 1 |
| 82 | 1 | −1 | 1 | 1 | 1 | −1 | 1 | 1 | 1 | 1 | −1 | −1 | −1 | 1 | 1 | 1 |
| 83 | 1 | 1 | −1 | −1 | 1 | −1 | 1 | −1 | 1 | 1 | −1 | −1 | 1 | 1 | −1 | 1 |
| 84 | 1 | −1 | −1 | −1 | 1 | −1 | 1 | 1 | 1 | 1 | −1 | 1 | −1 | −1 | −1 | 1 |
| 85 | 1 | −1 | −1 | −1 | −1 | −1 | 1 | −1 | 1 | −1 | 1 | −1 | −1 | −1 | −1 | 1 |
| 86 | 1 | 1 | −1 | −1 | −1 | 1 | 1 | 1 | 1 | 1 | −1 | 1 | 1 | −1 | 1 | 1 |
| 87 | 1 | −1 | 1 | −1 | −1 | 1 | 1 | −1 | 1 | 1 | 1 | 1 | 1 | −1 | 1 | 1 |
| 88 | 1 | 1 | 1 | −1 | −1 | 1 | −1 | −1 | 1 | 1 | −1 | −1 | 1 | 1 | 1 | 1 |
| 89 | 1 | −1 | 1 | 1 | 1 | 1 | 1 | −1 | 1 | 1 | −1 | 1 | −1 | 1 | 1 | 1 |
| 90 | 1 | −1 | 1 | −1 | 1 | 1 | −1 | 1 | −1 | 1 | 1 | −1 | 1 | 1 | 1 | −1 |
| 91 | 1 | −1 | −1 | −1 | 1 | 1 | −1 | 1 | 1 | −1 | 1 | 1 | 1 | 1 | −1 | −1 |
| 92 | 1 | −1 | −1 | 1 | 1 | −1 | 1 | 1 | −1 | 1 | 1 | 1 | 1 | 1 | −1 | 1 |
| 93 | 1 | −1 | −1 | −1 | −1 | −1 | 1 | −1 | −1 | −1 | 1 | 1 | −1 | 1 | −1 | −1 |
| 94 | 1 | −1 | 1 | −1 | −1 | 1 | 1 | −1 | 1 | 1 | −1 | 1 | 1 | 1 | 1 | 1 |
| 95 | 1 | −1 | 1 | 1 | −1 | −1 | 1 | −1 | −1 | −1 | 1 | 1 | 1 | 1 | 1 | 1 |
| 96 | 1 | −1 | 1 | −1 | −1 | 1 | 1 | −1 | −1 | 1 | 1 | 1 | 1 | 1 | 1 | −1 |
| 97 | 1 | −1 | 1 | −1 | 1 | 1 | 1 | −1 | 1 | −1 | 1 | 1 | 1 | 1 | 1 | 1 |
| 98 | 1 | −1 | 1 | 1 | −1 | 1 | 1 | −1 | −1 | −1 | −1 | 1 | 1 | 1 | 1 | 1 |
| 99 | 1 | −1 | −1 | 1 | 1 | 1 | 1 | 1 | 1 | 1 | −1 | 1 | 1 | 1 | −1 | 1 |
| 100 | 1 | −1 | −1 | 1 | 1 | −1 | 1 | 1 | 1 | 1 | −1 | 1 | 1 | 1 | −1 | 1 |
| 101 | −1 | −1 | −1 | −1 | 1 | −1 | 1 | −1 | −1 | −1 | −1 | −1 | 1 | −1 | 1 | 1 |
| 102 | −1 | −1 | −1 | −1 | 1 | 1 | 1 | 1 | −1 | 1 | 1 | 1 | −1 | 1 | −1 | 1 |
| 103 | −1 | −1 | 1 | −1 | 1 | 1 | 1 | 1 | −1 | −1 | 1 | 1 | 1 | −1 | 1 | 1 |
| 104 | −1 | −1 | 1 | −1 | 1 | 1 | 1 | 1 | 1 | −1 | 1 | −1 | −1 | 1 | 1 | 1 |
| 105 | 1 | 1 | 1 | 1 | 1 | −1 | −1 | 1 | 1 | 1 | 1 | −1 | 1 | 1 | 1 | 1 |
| 106 | 1 | −1 | 1 | −1 | 1 | 1 | −1 | 1 | 1 | 1 | 1 | 1 | −1 | 1 | 1 | −1 |
| 107 | 1 | 1 | −1 | 1 | 1 | 1 | 1 | −1 | 1 | 1 | 1 | 1 | 1 | −1 | 1 | −1 |
| 108 | 1 | −1 | −1 | 1 | 1 | 1 | −1 | 1 | 1 | 1 | 1 | 1 | −1 | −1 | 1 | 1 |
| 109 | −1 | −1 | −1 | −1 | 1 | −1 | 1 | −1 | 1 | 1 | 1 | 1 | −1 | −1 | −1 | −1 |
| 110 | −1 | 1 | −1 | 1 | 1 | 1 | 1 | −1 | 1 | 1 | 1 | −1 | 1 | −1 | 1 | 1 |
| 111 | −1 | −1 | 1 | 1 | 1 | 1 | 1 | 1 | 1 | 1 | −1 | 1 | 1 | −1 | 1 | 1 |
| 112 | −1 | 1 | 1 | −1 | 1 | 1 | 1 | 1 | 1 | 1 | 1 | −1 | 1 | 1 | 1 | −1 |
| 113 | 1 | −1 | 1 | 1 | 1 | 1 | −1 | −1 | 1 | 1 | 1 | 1 | 1 | 1 | −1 | 1 |
| 114 | 1 | −1 | 1 | −1 | 1 | −1 | 1 | −1 | −1 | 1 | 1 | 1 | 1 | −1 | 1 | −1 |
| 115 | 1 | −1 | 1 | 1 | 1 | 1 | −1 | 1 | 1 | 1 | −1 | 1 | 1 | 1 | −1 | 1 |
| 116 | 1 | −1 | 1 | 1 | 1 | −1 | −1 | −1 | 1 | 1 | 1 | 1 | 1 | 1 | −1 | 1 |
| 117 | −1 | −1 | 1 | 1 | 1 | −1 | −1 | −1 | 1 | −1 | 1 | −1 | 1 | 1 | −1 | −1 |
| 118 | −1 | −1 | 1 | 1 | 1 | 1 | −1 | −1 | 1 | 1 | 1 | −1 | 1 | −1 | 1 | 1 |
| 119 | −1 | −1 | 1 | 1 | 1 | −1 | 1 | −1 | −1 | 1 | 1 | 1 | −1 | 1 | −1 | 1 |
| 120 | −1 | −1 | 1 | −1 | 1 | 1 | 1 | −1 | −1 | 1 | 1 | 1 | −1 | 1 | −1 | −1 |

TABLE 1-continued

| INDEX | CODE | | | | | | | | | | | | | | | |
|---|---|---|---|---|---|---|---|---|---|---|---|---|---|---|---|---|
| 121 | 1 | 1 | 1 | -1 | 1 | -1 | 1 | 1 | -1 | 1 | 1 | 1 | 1 | 1 | -1 | 1 |
| 122 | 1 | -1 | 1 | -1 | 1 | -1 | 1 | -1 | 1 | 1 | 1 | -1 | 1 | -1 | 1 | 1 |
| 123 | 1 | 1 | 1 | -1 | 1 | -1 | -1 | -1 | -1 | 1 | -1 | -1 | 1 | 1 | -1 | 1 |
| 124 | 1 | -1 | 1 | -1 | 1 | -1 | -1 | 1 | -1 | 1 | -1 | 1 | 1 | -1 | -1 | 1 |
| 125 | -1 | -1 | 1 | -1 | 1 | -1 | -1 | -1 | -1 | 1 | -1 | -1 | -1 | -1 | -1 | 1 |
| 126 | -1 | 1 | 1 | -1 | 1 | -1 | -1 | 1 | -1 | 1 | -1 | 1 | -1 | 1 | -1 | 1 |
| 127 | -1 | -1 | 1 | -1 | 1 | -1 | 1 | 1 | -1 | 1 | 1 | 1 | 1 | -1 | -1 | 1 |
| 128 | -1 | 1 | 1 | -1 | 1 | -1 | 1 | -1 | 1 | 1 | -1 | -1 | 1 | -1 | 1 | 1 |
| 129 | 1 | 1 | 1 | 1 | 1 | 1 | -1 | -1 | 1 | 1 | 1 | -1 | -1 | 1 | 1 | 1 |
| 130 | 1 | 1 | 1 | 1 | -1 | -1 | -1 | 1 | -1 | 1 | 1 | -1 | -1 | 1 | 1 | -1 |
| 131 | 1 | 1 | -1 | -1 | 1 | 1 | -1 | 1 | 1 | 1 | 1 | -1 | -1 | -1 | -1 | -1 |
| 132 | 1 | 1 | -1 | 1 | 1 | -1 | -1 | 1 | -1 | 1 | 1 | -1 | 1 | -1 | -1 | 1 |
| 133 | 1 | 1 | -1 | -1 | -1 | -1 | -1 | -1 | -1 | 1 | 1 | -1 | -1 | -1 | -1 | -1 |
| 134 | 1 | 1 | -1 | 1 | -1 | 1 | -1 | -1 | -1 | 1 | 1 | -1 | 1 | -1 | -1 | 1 |
| 135 | 1 | 1 | 1 | 1 | -1 | -1 | -1 | -1 | -1 | 1 | 1 | -1 | 1 | -1 | 1 | 1 |
| 136 | 1 | 1 | 1 | -1 | -1 | 1 | -1 | -1 | 1 | 1 | 1 | 1 | -1 | 1 | 1 | -1 |
| 137 | 1 | 1 | 1 | -1 | 1 | 1 | -1 | 1 | 1 | -1 | 1 | 1 | -1 | 1 | 1 | 1 |
| 138 | 1 | -1 | 1 | -1 | 1 | -1 | -1 | 1 | -1 | 1 | -1 | -1 | -1 | 1 | 1 | 1 |
| 139 | 1 | 1 | -1 | 1 | 1 | 1 | -1 | 1 | 1 | 1 | 1 | -1 | 1 | -1 | 1 | 1 |
| 140 | 1 | -1 | -1 | -1 | 1 | 1 | -1 | 1 | 1 | 1 | 1 | -1 | 1 | -1 | 1 | 1 |
| 141 | 1 | -1 | -1 | -1 | -1 | 1 | -1 | -1 | -1 | 1 | -1 | -1 | -1 | -1 | -1 | 1 |
| 142 | 1 | 1 | -1 | -1 | -1 | 1 | -1 | 1 | -1 | 1 | 1 | -1 | 1 | 1 | -1 | 1 |
| 143 | 1 | -1 | 1 | -1 | 1 | 1 | -1 | 1 | -1 | 1 | 1 | 1 | -1 | 1 | 1 | 1 |
| 144 | 1 | 1 | 1 | -1 | -1 | 1 | -1 | -1 | -1 | 1 | -1 | 1 | 1 | 1 | 1 | 1 |
| 145 | 1 | 1 | -1 | -1 | 1 | 1 | 1 | 1 | 1 | 1 | 1 | -1 | -1 | 1 | 1 | 1 |
| 146 | 1 | 1 | -1 | -1 | 1 | -1 | 1 | -1 | 1 | -1 | 1 | -1 | -1 | 1 | 1 | 1 |
| 147 | 1 | 1 | -1 | 1 | 1 | 1 | -1 | 1 | 1 | 1 | -1 | -1 | -1 | 1 | 1 | 1 |
| 148 | 1 | 1 | -1 | 1 | 1 | -1 | 1 | 1 | 1 | -1 | 1 | 1 | -1 | 1 | 1 | 1 |
| 149 | 1 | 1 | -1 | -1 | -1 | -1 | -1 | -1 | -1 | -1 | -1 | -1 | -1 | -1 | 1 | 1 |
| 150 | 1 | 1 | -1 | -1 | -1 | 1 | -1 | 1 | -1 | 1 | -1 | 1 | -1 | 1 | 1 | 1 |
| 151 | 1 | 1 | -1 | -1 | 1 | -1 | 1 | 1 | 1 | 1 | 1 | -1 | 1 | 1 | 1 | 1 |
| 152 | 1 | 1 | -1 | -1 | -1 | 1 | 1 | -1 | 1 | 1 | -1 | -1 | 1 | -1 | 1 | 1 |
| 153 | 1 | 1 | -1 | 1 | 1 | 1 | -1 | 1 | -1 | 1 | 1 | 1 | -1 | 1 | 1 | 1 |
| 154 | 1 | -1 | -1 | -1 | 1 | 1 | 1 | -1 | 1 | -1 | 1 | 1 | -1 | -1 | 1 | -1 |
| 155 | 1 | 1 | -1 | -1 | 1 | 1 | -1 | 1 | -1 | 1 | -1 | 1 | -1 | 1 | 1 | -1 |
| 156 | 1 | -1 | -1 | 1 | 1 | 1 | -1 | 1 | 1 | 1 | 1 | 1 | 1 | -1 | 1 | 1 |
| 157 | 1 | -1 | -1 | -1 | -1 | 1 | -1 | -1 | -1 | 1 | -1 | -1 | -1 | -1 | 1 | -1 |
| 158 | 1 | 1 | -1 | 1 | -1 | 1 | -1 | -1 | -1 | -1 | 1 | -1 | 1 | 1 | 1 | 1 |
| 159 | 1 | -1 | -1 | 1 | -1 | 1 | 1 | 1 | -1 | -1 | 1 | -1 | 1 | -1 | 1 | 1 |
| 160 | 1 | 1 | -1 | -1 | 1 | 1 | -1 | 1 | -1 | 1 | 1 | -1 | 1 | 1 | 1 | -1 |
| 161 | 1 | 1 | -1 | -1 | 1 | 1 | 1 | 1 | -1 | 1 | 1 | 1 | 1 | 1 | 1 | 1 |
| 162 | 1 | -1 | -1 | -1 | 1 | 1 | 1 | -1 | -1 | 1 | -1 | 1 | -1 | 1 | 1 | 1 |
| 163 | 1 | 1 | -1 | -1 | 1 | 1 | -1 | -1 | -1 | -1 | -1 | 1 | 1 | 1 | 1 | 1 |
| 164 | 1 | -1 | 1 | -1 | 1 | 1 | -1 | -1 | -1 | -1 | 1 | -1 | -1 | 1 | 1 | 1 |
| 165 | -1 | -1 | -1 | -1 | 1 | 1 | -1 | -1 | -1 | 1 | -1 | -1 | -1 | 1 | 1 | 1 |
| 166 | -1 | 1 | -1 | -1 | 1 | 1 | -1 | 1 | -1 | -1 | 1 | 1 | -1 | 1 | 1 | 1 |
| 167 | -1 | -1 | -1 | -1 | 1 | 1 | 1 | 1 | -1 | -1 | 1 | 1 | -1 | 1 | 1 | 1 |
| 168 | -1 | 1 | -1 | -1 | 1 | -1 | -1 | -1 | -1 | 1 | -1 | -1 | -1 | 1 | 1 | 1 |
| 169 | 1 | 1 | -1 | 1 | 1 | 1 | 1 | -1 | -1 | 1 | 1 | 1 | 1 | -1 | 1 | 1 |
| 170 | 1 | 1 | -1 | -1 | 1 | -1 | 1 | -1 | -1 | -1 | 1 | 1 | 1 | -1 | 1 | -1 |
| 171 | 1 | 1 | -1 | -1 | 1 | 1 | -1 | -1 | -1 | 1 | -1 | 1 | 1 | -1 | 1 | -1 |
| 172 | 1 | 1 | -1 | 1 | 1 | -1 | -1 | -1 | -1 | -1 | -1 | 1 | 1 | -1 | 1 | 1 |
| 173 | -1 | 1 | -1 | -1 | 1 | -1 | 1 | -1 | -1 | 1 | -1 | 1 | -1 | 1 | 1 | -1 |
| 174 | -1 | 1 | -1 | 1 | 1 | -1 | -1 | -1 | 1 | -1 | 1 | -1 | -1 | 1 | 1 | 1 |
| 175 | -1 | 1 | -1 | 1 | 1 | -1 | 1 | -1 | -1 | -1 | 1 | -1 | 1 | -1 | 1 | 1 |
| 176 | -1 | 1 | -1 | -1 | 1 | 1 | 1 | -1 | -1 | 1 | 1 | 1 | 1 | -1 | 1 | 1 |
| 177 | 1 | 1 | 1 | 1 | 1 | -1 | 1 | -1 | -1 | -1 | 1 | 1 | -1 | 1 | 1 | -1 |
| 178 | 1 | -1 | 1 | 1 | 1 | 1 | -1 | -1 | -1 | 1 | 1 | 1 | 1 | -1 | 1 | -1 |
| 179 | 1 | 1 | -1 | -1 | 1 | 1 | -1 | -1 | -1 | 1 | 1 | 1 | 1 | -1 | 1 | -1 |
| 180 | 1 | -1 | -1 | 1 | 1 | 1 | -1 | -1 | -1 | 1 | 1 | 1 | 1 | -1 | 1 | 1 |
| 181 | -1 | -1 | -1 | 1 | 1 | 1 | -1 | -1 | -1 | 1 | 1 | -1 | -1 | -1 | 1 | -1 |
| 182 | -1 | 1 | -1 | 1 | 1 | -1 | -1 | -1 | -1 | 1 | -1 | -1 | 1 | -1 | 1 | -1 |
| 183 | -1 | -1 | 1 | 1 | 1 | -1 | -1 | -1 | -1 | 1 | 1 | -1 | -1 | 1 | 1 | 1 |
| 184 | -1 | 1 | 1 | -1 | 1 | -1 | -1 | -1 | -1 | 1 | 1 | -1 | 1 | 1 | 1 | -1 |
| 185 | 1 | 1 | 1 | -1 | 1 | 1 | 1 | 1 | 1 | 1 | 1 | 1 | 1 | 1 | 1 | 1 |
| 186 | 1 | 1 | 1 | -1 | 1 | -1 | -1 | -1 | -1 | 1 | -1 | 1 | -1 | 1 | 1 | 1 |
| 187 | 1 | 1 | -1 | -1 | 1 | 1 | -1 | -1 | 1 | 1 | -1 | 1 | -1 | -1 | 1 | 1 |
| 188 | 1 | 1 | -1 | -1 | 1 | -1 | -1 | 1 | -1 | 1 | 1 | 1 | -1 | -1 | -1 | 1 |
| 189 | -1 | 1 | -1 | -1 | 1 | -1 | -1 | -1 | -1 | 1 | -1 | 1 | -1 | -1 | -1 | 1 |
| 190 | -1 | 1 | 1 | -1 | 1 | -1 | -1 | 1 | -1 | 1 | 1 | 1 | 1 | -1 | -1 | -1 |
| 191 | -1 | 1 | 1 | -1 | 1 | -1 | -1 | -1 | -1 | 1 | 1 | 1 | -1 | 1 | -1 | 1 |
| 192 | -1 | 1 | 1 | -1 | 1 | 1 | -1 | -1 | 1 | 1 | -1 | -1 | 1 | -1 | 1 | 1 |
| 193 | 1 | 1 | 1 | 1 | 1 | 1 | 1 | -1 | -1 | 1 | 1 | 1 | 1 | 1 | 1 | -1 |
| 194 | 1 | -1 | 1 | 1 | 1 | -1 | -1 | 1 | -1 | 1 | -1 | 1 | -1 | -1 | 1 | -1 |
| 195 | 1 | 1 | -1 | 1 | 1 | -1 | -1 | 1 | 1 | -1 | -1 | 1 | -1 | 1 | -1 | -1 |
| 196 | 1 | -1 | -1 | 1 | 1 | -1 | 1 | 1 | 1 | 1 | 1 | -1 | -1 | -1 | -1 | -1 |
| 197 | 1 | -1 | 1 | 1 | -1 | -1 | -1 | -1 | 1 | 1 | -1 | -1 | -1 | -1 | -1 | -1 |
| 198 | 1 | 1 | -1 | 1 | -1 | -1 | -1 | 1 | -1 | 1 | 1 | 1 | -1 | 1 | -1 | -1 |

TABLE 1-continued

| INDEX | CODE |
|---|---|
| 199 | 1 -1 1 1 -1 -1 -1 1 -1 1 1 1 -1 -1 1 -1 |
| 200 | 1 1 1 1 -1 -1 -1 -1 1 1 -1 -1 1 1 1 -1 |
| 201 | 1 -1 1 1 1 1 -1 1 1 1 1 -1 -1 1 1 1 |
| 202 | 1 -1 1 -1 1 -1 -1 1 1 -1 1 -1 -1 1 1 -1 |
| 203 | 1 -1 -1 -1 1 1 -1 1 1 1 1 -1 -1 1 -1 -1 |
| 204 | 1 -1 1 -1 1 1 -1 1 1 1 -1 1 -1 1 -1 1 |
| 205 | 1 -1 -1 -1 -1 -1 1 1 -1 1 1 -1 -1 1 -1 -1 |
| 206 | 1 -1 -1 1 -1 1 -1 1 -1 1 1 -1 -1 1 -1 1 |
| 207 | 1 -1 1 1 -1 -1 -1 1 -1 -1 1 -1 -1 1 1 1 |
| 208 | 1 -1 1 -1 -1 1 -1 1 -1 1 1 -1 -1 1 1 -1 |
| 209 | 1 1 -1 1 1 -1 1 1 1 1 1 -1 -1 1 1 1 |
| 210 | 1 -1 -1 -1 1 -1 1 1 1 1 1 -1 -1 -1 1 -1 |
| 211 | 1 1 -1 -1 1 -1 -1 1 1 1 -1 -1 -1 1 1 -1 |
| 212 | 1 -1 -1 1 1 -1 -1 1 1 1 -1 1 -1 -1 1 1 |
| 213 | 1 -1 -1 -1 -1 -1 -1 1 -1 1 1 -1 -1 1 1 -1 |
| 214 | 1 1 -1 1 -1 -1 -1 1 -1 1 -1 -1 -1 1 1 1 |
| 215 | 1 -1 -1 1 -1 -1 1 1 -1 1 1 -1 -1 -1 1 -1 |
| 216 | 1 1 -1 -1 -1 -1 1 1 -1 1 1 -1 -1 1 1 -1 |
| 217 | 1 -1 -1 1 1 1 1 1 1 1 1 -1 -1 1 1 -1 |
| 218 | 1 -1 -1 1 1 -1 1 -1 1 -1 1 -1 -1 1 1 -1 |
| 219 | 1 -1 -1 1 1 1 -1 -1 1 1 -1 -1 -1 1 1 -1 |
| 220 | 1 -1 -1 1 1 -1 -1 1 1 -1 1 -1 -1 1 1 -1 |
| 221 | 1 -1 -1 1 -1 1 -1 -1 -1 1 -1 -1 -1 1 1 -1 |
| 222 | 1 -1 -1 1 -1 1 -1 1 -1 1 -1 -1 -1 1 1 -1 |
| 223 | 1 -1 -1 1 -1 -1 1 1 -1 1 1 -1 -1 1 1 -1 |
| 224 | 1 -1 -1 1 -1 1 1 -1 -1 1 1 -1 -1 1 1 -1 |
| 225 | 1 -1 -1 1 1 1 1 1 -1 1 1 -1 -1 1 1 1 |
| 226 | 1 -1 -1 -1 1 -1 1 1 -1 -1 1 -1 -1 1 1 -1 |
| 227 | 1 -1 -1 -1 1 1 -1 1 -1 1 -1 -1 -1 1 1 -1 |
| 228 | 1 -1 -1 1 1 -1 -1 1 -1 -1 -1 -1 -1 1 1 1 |
| 229 | -1 -1 -1 1 -1 -1 -1 1 -1 1 1 -1 -1 1 1 -1 |
| 230 | -1 -1 -1 1 1 -1 1 -1 1 -1 1 -1 -1 1 1 1 |
| 231 | -1 -1 -1 1 -1 1 1 -1 -1 1 1 -1 -1 1 1 1 |
| 232 | -1 -1 -1 -1 1 1 1 -1 1 1 1 -1 -1 1 1 -1 |
| 233 | 1 1 -1 1 1 -1 1 -1 1 1 1 1 -1 1 1 -1 |
| 234 | 1 -1 -1 1 1 -1 1 -1 -1 1 1 -1 1 -1 1 -1 |
| 235 | 1 1 -1 1 1 -1 -1 -1 -1 1 -1 -1 -1 1 1 -1 |
| 236 | 1 -1 -1 1 1 -1 -1 1 -1 1 -1 1 1 -1 1 -1 |
| 237 | -1 -1 -1 1 1 -1 -1 -1 -1 1 -1 -1 -1 -1 1 -1 |
| 238 | -1 1 -1 1 1 -1 -1 -1 1 1 -1 -1 -1 1 1 1 |
| 239 | -1 -1 -1 1 1 -1 1 1 -1 1 1 1 -1 -1 1 1 |
| 240 | -1 1 -1 1 1 -1 1 -1 -1 1 1 -1 -1 1 1 -1 |
| 241 | 1 -1 1 1 1 1 -1 1 -1 1 1 1 1 1 1 -1 |
| 242 | 1 -1 1 1 -1 1 -1 -1 -1 -1 1 1 1 1 1 -1 |
| 243 | 1 -1 -1 1 1 1 -1 -1 1 -1 1 1 1 1 -1 -1 |
| 244 | 1 -1 -1 1 1 -1 1 -1 -1 1 1 1 1 1 -1 -1 |
| 245 | -1 -1 -1 1 1 -1 -1 -1 -1 1 -1 1 -1 1 -1 -1 |
| 246 | -1 -1 -1 1 1 -1 -1 1 -1 1 1 1 -1 1 -1 -1 |
| 247 | -1 -1 1 1 1 -1 -1 1 -1 -1 1 1 1 1 1 -1 |
| 248 | -1 -1 1 1 1 1 -1 -1 1 -1 1 -1 1 1 1 -1 |
| 249 | 1 1 1 1 1 -1 -1 1 -1 1 -1 1 1 1 1 1 |
| 250 | 1 -1 1 1 -1 1 1 -1 1 1 1 1 1 -1 1 -1 |
| 251 | 1 1 -1 -1 1 1 -1 1 -1 1 1 -1 1 1 -1 -1 |
| 252 | 1 -1 -1 1 1 -1 1 -1 1 1 1 -1 1 -1 -1 1 |
| 253 | -1 -1 -1 -1 1 1 -1 1 -1 1 1 -1 -1 -1 -1 -1 |
| 254 | -1 1 -1 1 1 1 1 -1 1 1 1 -1 1 -1 1 1 |
| 255 | -1 -1 -1 1 1 -1 -1 1 -1 1 1 -1 -1 -1 1 -1 |
| 256 | -1 1 -1 1 -1 1 1 -1 1 -1 1 -1 -1 1 1 -1 |
| 257 | 1 1 1 1 -1 -1 -1 -1 1 1 1 1 1 1 1 1 |
| 258 | 1 -1 1 -1 -1 -1 -1 1 1 1 1 1 -1 1 1 -1 |
| 259 | 1 1 -1 1 -1 -1 -1 1 1 1 1 1 -1 1 1 -1 |
| 260 | 1 -1 1 1 -1 -1 -1 1 1 1 1 1 -1 -1 1 1 |
| 261 | -1 -1 -1 -1 -1 -1 -1 1 1 1 1 -1 -1 -1 1 -1 |
| 262 | -1 1 -1 1 -1 -1 -1 1 1 1 1 1 -1 1 1 1 |
| 263 | -1 -1 1 1 1 -1 -1 1 1 1 1 1 -1 1 1 -1 |
| 264 | -1 1 1 -1 -1 -1 -1 1 1 1 1 1 -1 1 1 -1 |
| 265 | 1 -1 1 -1 -1 1 -1 1 1 1 1 1 1 1 1 1 |
| 266 | 1 -1 1 -1 -1 -1 -1 1 -1 1 -1 1 1 1 1 1 |
| 267 | 1 -1 -1 -1 -1 1 -1 1 1 1 1 1 1 -1 1 1 |
| 268 | 1 -1 -1 1 -1 1 -1 1 -1 1 1 1 1 1 -1 1 |
| 269 | -1 -1 -1 -1 1 -1 -1 1 -1 1 1 -1 -1 1 -1 1 |
| 270 | -1 -1 -1 -1 -1 1 -1 1 1 1 1 -1 1 1 -1 1 |
| 271 | -1 -1 1 -1 1 -1 -1 1 1 -1 1 1 -1 1 1 1 |
| 272 | -1 -1 1 -1 1 -1 -1 1 -1 1 1 -1 1 1 1 1 |
| 273 | 1 1 -1 -1 -1 1 1 1 1 1 1 1 1 1 1 1 |
| 274 | 1 -1 -1 -1 -1 1 -1 1 1 1 -1 1 -1 1 1 1 |
| 275 | 1 1 -1 -1 -1 -1 -1 1 1 -1 -1 1 1 1 1 1 |
| 276 | 1 -1 -1 -1 -1 -1 -1 1 1 1 -1 1 1 -1 1 1 |

TABLE 1-continued

| INDEX | CODE | | | | | | | | | | | | | | | |
|---|---|---|---|---|---|---|---|---|---|---|---|---|---|---|---|---|
| 277 | -1 | -1 | -1 | -1 | -1 | -1 | -1 | -1 | 1 | 1 | -1 | -1 | -1 | -1 | 1 | 1 |
| 278 | -1 | 1 | -1 | -1 | -1 | -1 | -1 | 1 | 1 | 1 | -1 | 1 | -1 | 1 | 1 | 1 |
| 279 | -1 | -1 | -1 | -1 | -1 | -1 | 1 | 1 | 1 | 1 | 1 | 1 | -1 | -1 | 1 | 1 |
| 280 | -1 | 1 | -1 | -1 | -1 | -1 | 1 | -1 | 1 | 1 | 1 | -1 | -1 | 1 | 1 | 1 |
| 281 | 1 | -1 | -1 | 1 | -1 | 1 | 1 | -1 | 1 | 1 | 1 | 1 | 1 | 1 | 1 | 1 |
| 282 | 1 | -1 | -1 | -1 | -1 | -1 | 1 | -1 | 1 | 1 | -1 | 1 | 1 | 1 | 1 | -1 |
| 283 | 1 | -1 | -1 | -1 | -1 | 1 | -1 | -1 | 1 | 1 | -1 | 1 | 1 | 1 | 1 | -1 |
| 284 | 1 | -1 | -1 | 1 | -1 | -1 | -1 | -1 | 1 | -1 | -1 | 1 | 1 | 1 | 1 | 1 |
| 285 | -1 | -1 | -1 | -1 | -1 | -1 | -1 | -1 | 1 | -1 | -1 | 1 | -1 | 1 | 1 | -1 |
| 286 | -1 | -1 | -1 | 1 | -1 | 1 | -1 | -1 | 1 | 1 | 1 | 1 | -1 | 1 | 1 | 1 |
| 287 | -1 | -1 | -1 | -1 | -1 | -1 | 1 | -1 | 1 | 1 | -1 | 1 | 1 | 1 | 1 | 1 |
| 288 | -1 | -1 | -1 | -1 | -1 | 1 | -1 | 1 | 1 | 1 | 1 | 1 | -1 | 1 | 1 | -1 |
| 289 | -1 | -1 | -1 | -1 | 1 | 1 | 1 | 1 | 1 | 1 | 1 | 1 | 1 | 1 | 1 | 1 |
| 290 | -1 | -1 | -1 | -1 | 1 | 1 | 1 | -1 | 1 | -1 | 1 | -1 | 1 | 1 | 1 | 1 |
| 291 | -1 | -1 | -1 | -1 | 1 | 1 | -1 | -1 | 1 | 1 | -1 | -1 | 1 | 1 | 1 | 1 |
| 292 | -1 | -1 | -1 | 1 | -1 | -1 | 1 | 1 | -1 | 1 | -1 | 1 | 1 | 1 | 1 | 1 |
| 293 | -1 | -1 | -1 | -1 | -1 | -1 | -1 | -1 | 1 | -1 | -1 | -1 | -1 | 1 | 1 | 1 |
| 294 | -1 | -1 | -1 | -1 | -1 | 1 | -1 | 1 | -1 | 1 | -1 | 1 | 1 | 1 | 1 | 1 |
| 295 | -1 | -1 | -1 | -1 | -1 | 1 | 1 | 1 | -1 | 1 | 1 | 1 | 1 | 1 | 1 | 1 |
| 296 | -1 | -1 | -1 | -1 | 1 | 1 | -1 | -1 | 1 | 1 | -1 | 1 | 1 | 1 | 1 | 1 |
| 297 | -1 | 1 | -1 | 1 | 1 | -1 | 1 | -1 | 1 | 1 | 1 | 1 | 1 | 1 | 1 | 1 |
| 298 | -1 | -1 | -1 | -1 | 1 | -1 | -1 | 1 | 1 | 1 | 1 | 1 | -1 | 1 | 1 | -1 |
| 299 | -1 | 1 | -1 | 1 | -1 | -1 | -1 | 1 | 1 | -1 | 1 | 1 | 1 | 1 | 1 | 1 |
| 300 | -1 | -1 | 1 | 1 | -1 | 1 | -1 | 1 | 1 | -1 | 1 | 1 | -1 | 1 | 1 | 1 |
| 301 | -1 | -1 | -1 | -1 | -1 | -1 | -1 | -1 | 1 | -1 | 1 | 1 | -1 | 1 | 1 | -1 |
| 302 | -1 | 1 | -1 | 1 | -1 | -1 | -1 | -1 | -1 | 1 | -1 | 1 | 1 | 1 | 1 | 1 |
| 303 | -1 | -1 | -1 | -1 | -1 | 1 | -1 | -1 | 1 | 1 | 1 | 1 | 1 | -1 | 1 | 1 |
| 304 | -1 | 1 | -1 | 1 | -1 | -1 | 1 | -1 | -1 | 1 | 1 | 1 | 1 | 1 | 1 | -1 |
| 305 | -1 | -1 | 1 | 1 | 1 | 1 | -1 | -1 | 1 | 1 | 1 | 1 | 1 | 1 | 1 | 1 |
| 306 | -1 | -1 | 1 | -1 | 1 | -1 | -1 | -1 | 1 | -1 | 1 | 1 | 1 | 1 | 1 | -1 |
| 307 | -1 | -1 | -1 | -1 | 1 | 1 | -1 | -1 | 1 | 1 | 1 | 1 | 1 | 1 | -1 | -1 |
| 308 | -1 | -1 | -1 | -1 | 1 | -1 | -1 | 1 | 1 | -1 | 1 | 1 | 1 | 1 | -1 | 1 |
| 309 | -1 | -1 | -1 | -1 | -1 | -1 | -1 | -1 | -1 | 1 | 1 | 1 | 1 | -1 | -1 | -1 |
| 310 | -1 | -1 | -1 | 1 | -1 | 1 | -1 | -1 | -1 | 1 | 1 | 1 | 1 | 1 | -1 | 1 |
| 311 | -1 | -1 | 1 | 1 | -1 | -1 | -1 | -1 | -1 | 1 | 1 | 1 | 1 | 1 | 1 | 1 |
| 312 | -1 | -1 | 1 | -1 | -1 | -1 | -1 | -1 | 1 | 1 | 1 | 1 | 1 | 1 | 1 | -1 |
| 313 | -1 | 1 | 1 | -1 | 1 | -1 | 1 | 1 | 1 | 1 | 1 | 1 | 1 | 1 | 1 | 1 |
| 314 | -1 | -1 | 1 | -1 | 1 | -1 | -1 | -1 | 1 | 1 | -1 | 1 | -1 | 1 | 1 | 1 |
| 315 | -1 | 1 | -1 | -1 | 1 | -1 | -1 | -1 | 1 | 1 | -1 | 1 | 1 | -1 | 1 | 1 |
| 316 | -1 | -1 | -1 | -1 | 1 | 1 | 1 | 1 | 1 | 1 | 1 | 1 | -1 | 1 | 1 | 1 |
| 317 | -1 | -1 | -1 | -1 | -1 | -1 | -1 | -1 | 1 | -1 | 1 | -1 | 1 | -1 | 1 | 1 |
| 318 | -1 | 1 | -1 | -1 | -1 | -1 | 1 | -1 | 1 | 1 | 1 | 1 | 1 | -1 | 1 | 1 |
| 319 | -1 | -1 | 1 | -1 | -1 | -1 | 1 | -1 | 1 | 1 | 1 | 1 | -1 | 1 | 1 | 1 |
| 320 | -1 | 1 | 1 | -1 | -1 | -1 | -1 | -1 | 1 | 1 | -1 | 1 | 1 | 1 | 1 | 1 |
| 321 | 1 | 1 | 1 | 1 | -1 | 1 | -1 | 1 | 1 | 1 | 1 | 1 | -1 | 1 | 1 | -1 |
| 322 | 1 | 1 | 1 | 1 | -1 | -1 | -1 | -1 | 1 | -1 | 1 | -1 | 1 | -1 | 1 | -1 |
| 323 | 1 | 1 | -1 | 1 | -1 | 1 | -1 | -1 | 1 | 1 | 1 | -1 | 1 | -1 | -1 | -1 |
| 324 | 1 | -1 | -1 | 1 | 1 | 1 | 1 | -1 | 1 | -1 | 1 | 1 | 1 | -1 | 1 | -1 |
| 325 | -1 | 1 | -1 | 1 | -1 | -1 | 1 | -1 | 1 | -1 | 1 | -1 | -1 | -1 | -1 | -1 |
| 326 | -1 | 1 | -1 | 1 | -1 | 1 | 1 | -1 | 1 | 1 | 1 | -1 | -1 | -1 | -1 | 1 |
| 327 | -1 | 1 | 1 | 1 | -1 | 1 | -1 | 1 | -1 | 1 | 1 | -1 | 1 | -1 | 1 | -1 |
| 328 | -1 | 1 | 1 | 1 | 1 | -1 | 1 | 1 | -1 | 1 | 1 | -1 | -1 | -1 | -1 | 1 |
| 329 | 1 | 1 | 1 | 1 | -1 | 1 | -1 | 1 | -1 | 1 | -1 | 1 | 1 | 1 | 1 | 1 |
| 330 | 1 | -1 | 1 | -1 | -1 | 1 | 1 | 1 | -1 | 1 | -1 | 1 | -1 | 1 | 1 | -1 |
| 331 | 1 | 1 | -1 | -1 | 1 | 1 | -1 | 1 | -1 | 1 | -1 | 1 | 1 | -1 | 1 | -1 |
| 332 | 1 | -1 | 1 | 1 | 1 | 1 | 1 | 1 | 1 | 1 | -1 | 1 | 1 | -1 | -1 | 1 |
| 333 | -1 | -1 | 1 | 1 | 1 | 1 | 1 | 1 | 1 | 1 | -1 | -1 | -1 | -1 | 1 | -1 |
| 334 | -1 | 1 | -1 | 1 | 1 | 1 | 1 | 1 | 1 | 1 | -1 | 1 | -1 | 1 | -1 | -1 |
| 335 | -1 | -1 | 1 | 1 | 1 | -1 | 1 | 1 | 1 | -1 | -1 | -1 | -1 | 1 | 1 | 1 |
| 336 | -1 | 1 | 1 | -1 | 1 | -1 | 1 | 1 | 1 | -1 | -1 | -1 | 1 | 1 | 1 | -1 |
| 337 | 1 | 1 | -1 | 1 | -1 | 1 | 1 | 1 | 1 | 1 | 1 | 1 | 1 | -1 | 1 | 1 |
| 338 | 1 | 1 | -1 | -1 | -1 | 1 | 1 | 1 | -1 | 1 | -1 | 1 | -1 | 1 | 1 | -1 |
| 339 | 1 | 1 | -1 | -1 | 1 | -1 | 1 | 1 | 1 | -1 | -1 | 1 | 1 | -1 | 1 | -1 |
| 340 | 1 | 1 | -1 | 1 | -1 | -1 | 1 | -1 | 1 | -1 | -1 | 1 | 1 | -1 | 1 | 1 |
| 341 | -1 | 1 | -1 | -1 | 1 | 1 | 1 | -1 | 1 | -1 | 1 | -1 | 1 | -1 | 1 | 1 |
| 342 | -1 | 1 | -1 | -1 | 1 | 1 | 1 | 1 | 1 | -1 | -1 | 1 | -1 | 1 | 1 | 1 |
| 343 | -1 | 1 | -1 | 1 | -1 | 1 | 1 | -1 | 1 | -1 | 1 | -1 | -1 | -1 | 1 | 1 |
| 344 | -1 | 1 | -1 | -1 | 1 | -1 | 1 | 1 | 1 | 1 | -1 | 1 | -1 | 1 | 1 | -1 |
| 345 | 1 | 1 | 1 | -1 | -1 | 1 | 1 | 1 | 1 | 1 | 1 | 1 | 1 | 1 | 1 | 1 |
| 346 | 1 | -1 | 1 | 1 | 1 | -1 | 1 | -1 | 1 | -1 | 1 | -1 | 1 | -1 | 1 | 1 |
| 347 | 1 | 1 | -1 | 1 | 1 | -1 | 1 | 1 | -1 | -1 | -1 | 1 | 1 | -1 | 1 | 1 |
| 348 | 1 | -1 | -1 | 1 | -1 | 1 | -1 | 1 | 1 | -1 | 1 | 1 | 1 | 1 | 1 | -1 |
| 349 | -1 | 1 | -1 | 1 | -1 | 1 | -1 | -1 | 1 | 1 | -1 | 1 | -1 | 1 | 1 | -1 |
| 350 | -1 | 1 | -1 | 1 | 1 | -1 | 1 | -1 | 1 | 1 | -1 | 1 | -1 | 1 | 1 | 1 |
| 351 | -1 | -1 | -1 | 1 | -1 | 1 | 1 | 1 | 1 | 1 | 1 | 1 | -1 | -1 | 1 | 1 |
| 352 | -1 | 1 | -1 | 1 | -1 | 1 | 1 | -1 | 1 | -1 | 1 | -1 | -1 | 1 | 1 | -1 |
| 353 | -1 | 1 | -1 | 1 | 1 | 1 | 1 | 1 | -1 | 1 | -1 | 1 | 1 | 1 | 1 | 1 |
| 354 | -1 | -1 | -1 | -1 | 1 | 1 | 1 | 1 | 1 | -1 | 1 | -1 | 1 | -1 | 1 | -1 |

TABLE 1-continued

| INDEX | CODE | | | | | | | | | | | | | | | |
|---|---|---|---|---|---|---|---|---|---|---|---|---|---|---|---|---|
| 355 | −1 | 1 | −1 | −1 | 1 | 1 | −1 | 1 | 1 | −1 | −1 | −1 | 1 | 1 | 1 | −1 |
| 356 | −1 | 1 | −1 | 1 | 1 | 1 | −1 | 1 | 1 | −1 | −1 | 1 | 1 | −1 | 1 | 1 |
| 357 | −1 | −1 | −1 | 1 | −1 | 1 | −1 | 1 | −1 | −1 | −1 | 1 | 1 | −1 | 1 | −1 |
| 358 | −1 | 1 | −1 | 1 | −1 | 1 | −1 | 1 | −1 | −1 | −1 | 1 | 1 | 1 | 1 | 1 |
| 359 | −1 | −1 | −1 | 1 | −1 | 1 | 1 | 1 | −1 | −1 | 1 | −1 | 1 | −1 | 1 | 1 |
| 360 | −1 | 1 | −1 | −1 | −1 | 1 | 1 | −1 | −1 | 1 | −1 | 1 | 1 | 1 | 1 | −1 |
| 361 | −1 | 1 | −1 | 1 | 1 | 1 | 1 | 1 | 1 | 1 | 1 | 1 | 1 | −1 | 1 | −1 |
| 362 | −1 | 1 | −1 | 1 | 1 | −1 | 1 | −1 | 1 | −1 | 1 | −1 | 1 | −1 | 1 | −1 |
| 363 | −1 | 1 | −1 | 1 | 1 | 1 | −1 | −1 | 1 | 1 | −1 | −1 | 1 | −1 | 1 | −1 |
| 364 | −1 | 1 | −1 | 1 | 1 | −1 | −1 | 1 | 1 | 1 | −1 | 1 | 1 | −1 | 1 | −1 |
| 365 | −1 | 1 | −1 | 1 | −1 | −1 | −1 | −1 | −1 | −1 | −1 | 1 | 1 | −1 | 1 | −1 |
| 366 | −1 | 1 | −1 | 1 | −1 | 1 | −1 | 1 | −1 | 1 | −1 | 1 | 1 | −1 | 1 | −1 |
| 367 | −1 | 1 | −1 | 1 | −1 | −1 | 1 | −1 | −1 | 1 | 1 | 1 | 1 | −1 | 1 | −1 |
| 368 | −1 | 1 | −1 | 1 | −1 | 1 | 1 | −1 | −1 | 1 | 1 | 1 | 1 | −1 | 1 | −1 |
| 369 | −1 | 1 | 1 | 1 | 1 | 1 | −1 | 1 | −1 | 1 | 1 | 1 | 1 | 1 | 1 | −1 |
| 370 | −1 | −1 | 1 | 1 | 1 | 1 | −1 | −1 | 1 | 1 | −1 | 1 | 1 | −1 | 1 | −1 |
| 371 | −1 | 1 | −1 | 1 | 1 | −1 | −1 | 1 | −1 | 1 | −1 | 1 | 1 | −1 | −1 | −1 |
| 372 | −1 | −1 | −1 | 1 | 1 | −1 | 1 | 1 | −1 | 1 | 1 | 1 | 1 | −1 | −1 | −1 |
| 373 | −1 | −1 | 1 | 1 | −1 | 1 | −1 | −1 | −1 | −1 | 1 | 1 | 1 | −1 | 1 | −1 |
| 374 | −1 | 1 | −1 | 1 | −1 | 1 | 1 | −1 | 1 | −1 | 1 | 1 | 1 | 1 | −1 | −1 |
| 375 | −1 | −1 | 1 | 1 | −1 | 1 | 1 | −1 | 1 | −1 | 1 | 1 | 1 | −1 | 1 | −1 |
| 376 | −1 | 1 | 1 | 1 | −1 | 1 | −1 | −1 | −1 | −1 | 1 | −1 | 1 | 1 | 1 | −1 |
| 377 | −1 | 1 | 1 | 1 | 1 | 1 | 1 | 1 | 1 | 1 | 1 | 1 | 1 | −1 | 1 | 1 |
| 378 | −1 | 1 | 1 | −1 | 1 | −1 | −1 | 1 | 1 | −1 | 1 | 1 | −1 | 1 | 1 | −1 |
| 379 | −1 | 1 | −1 | −1 | 1 | 1 | −1 | 1 | 1 | 1 | 1 | −1 | 1 | −1 | −1 | −1 |
| 380 | −1 | 1 | −1 | 1 | 1 | −1 | −1 | 1 | 1 | −1 | 1 | −1 | 1 | −1 | −1 | 1 |
| 381 | −1 | 1 | −1 | −1 | −1 | 1 | 1 | 1 | −1 | 1 | 1 | 1 | 1 | −1 | −1 | −1 |
| 382 | −1 | 1 | −1 | 1 | −1 | 1 | 1 | −1 | 1 | −1 | 1 | 1 | 1 | −1 | −1 | 1 |
| 383 | −1 | 1 | 1 | 1 | −1 | −1 | 1 | −1 | 1 | −1 | 1 | −1 | 1 | −1 | 1 | 1 |
| 384 | −1 | 1 | 1 | −1 | 1 | −1 | 1 | −1 | 1 | −1 | 1 | 1 | 1 | −1 | 1 | −1 |
| 385 | 1 | 1 | 1 | 1 | −1 | 1 | 1 | 1 | 1 | 1 | 1 | 1 | 1 | 1 | −1 | −1 |
| 386 | 1 | −1 | 1 | 1 | −1 | −1 | 1 | −1 | 1 | 1 | 1 | −1 | 1 | −1 | −1 | −1 |
| 387 | 1 | 1 | 1 | 1 | −1 | −1 | −1 | 1 | 1 | −1 | −1 | 1 | 1 | 1 | −1 | −1 |
| 388 | 1 | −1 | 1 | 1 | −1 | −1 | −1 | 1 | 1 | 1 | 1 | 1 | 1 | −1 | −1 | −1 |
| 389 | −1 | 1 | 1 | 1 | −1 | −1 | −1 | 1 | 1 | −1 | −1 | −1 | −1 | −1 | −1 | −1 |
| 390 | −1 | 1 | 1 | 1 | −1 | −1 | −1 | 1 | 1 | 1 | 1 | −1 | 1 | −1 | −1 | −1 |
| 391 | −1 | −1 | 1 | 1 | −1 | −1 | 1 | 1 | 1 | 1 | 1 | 1 | −1 | −1 | −1 | −1 |
| 392 | −1 | 1 | 1 | 1 | −1 | −1 | 1 | −1 | 1 | 1 | −1 | −1 | 1 | −1 | 1 | −1 |
| 393 | 1 | −1 | 1 | 1 | −1 | 1 | 1 | 1 | 1 | 1 | 1 | −1 | 1 | 1 | −1 | 1 |
| 394 | 1 | −1 | 1 | −1 | −1 | 1 | 1 | 1 | −1 | 1 | −1 | 1 | 1 | −1 | 1 | −1 |
| 395 | 1 | −1 | 1 | −1 | −1 | 1 | −1 | 1 | 1 | −1 | −1 | 1 | 1 | −1 | 1 | −1 |
| 396 | 1 | −1 | 1 | 1 | −1 | −1 | −1 | 1 | 1 | −1 | −1 | −1 | 1 | 1 | −1 | 1 |
| 397 | −1 | −1 | 1 | −1 | −1 | −1 | −1 | 1 | 1 | −1 | −1 | −1 | 1 | −1 | −1 | −1 |
| 398 | −1 | −1 | 1 | 1 | −1 | −1 | 1 | 1 | 1 | 1 | −1 | −1 | 1 | −1 | −1 | 1 |
| 399 | −1 | −1 | 1 | 1 | 1 | −1 | 1 | 1 | 1 | −1 | 1 | −1 | 1 | 1 | −1 | 1 |
| 400 | −1 | −1 | 1 | −1 | −1 | 1 | 1 | 1 | 1 | 1 | 1 | −1 | −1 | 1 | −1 | −1 |
| 401 | 1 | 1 | 1 | 1 | −1 | −1 | 1 | 1 | 1 | 1 | −1 | −1 | 1 | 1 | 1 | 1 |
| 402 | 1 | −1 | 1 | 1 | 1 | 1 | 1 | 1 | 1 | 1 | −1 | 1 | 1 | −1 | 1 | −1 |
| 403 | 1 | 1 | −1 | −1 | −1 | 1 | 1 | 1 | 1 | 1 | −1 | −1 | 1 | 1 | −1 | −1 |
| 404 | 1 | −1 | −1 | 1 | −1 | 1 | 1 | 1 | 1 | 1 | 1 | −1 | 1 | −1 | −1 | 1 |
| 405 | −1 | −1 | −1 | −1 | −1 | 1 | 1 | 1 | 1 | 1 | −1 | −1 | −1 | −1 | −1 | −1 |
| 406 | −1 | 1 | 1 | 1 | 1 | 1 | 1 | 1 | 1 | 1 | 1 | 1 | 1 | −1 | −1 | 1 |
| 407 | −1 | −1 | 1 | 1 | −1 | −1 | 1 | 1 | 1 | 1 | −1 | −1 | −1 | −1 | 1 | 1 |
| 408 | −1 | 1 | 1 | −1 | 1 | 1 | 1 | 1 | 1 | 1 | −1 | −1 | 1 | 1 | 1 | −1 |
| 409 | 1 | −1 | 1 | 1 | 1 | 1 | 1 | 1 | 1 | −1 | 1 | 1 | 1 | 1 | 1 | −1 |
| 410 | 1 | −1 | 1 | 1 | −1 | 1 | 1 | −1 | 1 | −1 | 1 | −1 | 1 | 1 | 1 | 1 |
| 411 | 1 | −1 | −1 | 1 | −1 | 1 | 1 | 1 | −1 | 1 | −1 | 1 | 1 | 1 | −1 | −1 |
| 412 | 1 | −1 | −1 | 1 | −1 | 1 | 1 | 1 | 1 | −1 | 1 | 1 | 1 | 1 | −1 | −1 |
| 413 | −1 | −1 | −1 | 1 | −1 | 1 | 1 | −1 | 1 | −1 | 1 | −1 | −1 | 1 | −1 | −1 |
| 414 | −1 | −1 | −1 | 1 | −1 | 1 | 1 | 1 | 1 | 1 | 1 | 1 | −1 | 1 | −1 | −1 |
| 415 | −1 | −1 | 1 | 1 | −1 | 1 | 1 | 1 | 1 | −1 | −1 | 1 | 1 | 1 | 1 | −1 |
| 416 | −1 | −1 | 1 | 1 | 1 | 1 | 1 | −1 | 1 | 1 | 1 | −1 | −1 | 1 | 1 | −1 |
| 417 | −1 | −1 | 1 | 1 | 1 | 1 | 1 | 1 | 1 | 1 | 1 | −1 | 1 | 1 | 1 | 1 |
| 418 | −1 | −1 | 1 | −1 | 1 | −1 | 1 | 1 | 1 | −1 | −1 | 1 | 1 | 1 | 1 | −1 |
| 419 | −1 | −1 | −1 | 1 | −1 | 1 | 1 | 1 | 1 | 1 | 1 | 1 | 1 | 1 | −1 | −1 |
| 420 | −1 | −1 | −1 | 1 | 1 | 1 | 1 | −1 | 1 | 1 | −1 | −1 | 1 | −1 | 1 | 1 |
| 421 | −1 | −1 | −1 | −1 | −1 | 1 | 1 | −1 | 1 | −1 | −1 | 1 | 1 | −1 | 1 | −1 |
| 422 | −1 | −1 | −1 | 1 | −1 | 1 | 1 | −1 | 1 | 1 | 1 | 1 | 1 | −1 | 1 | 1 |
| 423 | −1 | −1 | 1 | 1 | −1 | 1 | 1 | 1 | −1 | −1 | 1 | 1 | 1 | −1 | 1 | 1 |
| 424 | −1 | −1 | 1 | −1 | −1 | 1 | 1 | −1 | 1 | −1 | 1 | 1 | 1 | 1 | 1 | −1 |
| 425 | −1 | 1 | 1 | 1 | 1 | −1 | 1 | 1 | 1 | −1 | 1 | 1 | 1 | 1 | 1 | 1 |
| 426 | −1 | −1 | 1 | 1 | 1 | −1 | 1 | −1 | 1 | 1 | −1 | 1 | 1 | −1 | 1 | −1 |
| 427 | −1 | 1 | 1 | 1 | 1 | −1 | 1 | −1 | 1 | 1 | 1 | −1 | 1 | −1 | 1 | −1 |
| 428 | −1 | −1 | −1 | 1 | −1 | 1 | 1 | 1 | −1 | 1 | 1 | 1 | −1 | −1 | 1 | −1 |
| 429 | −1 | −1 | −1 | 1 | −1 | 1 | −1 | −1 | 1 | −1 | 1 | 1 | 1 | −1 | −1 | −1 |
| 430 | −1 | 1 | −1 | 1 | −1 | 1 | 1 | −1 | 1 | 1 | 1 | 1 | 1 | −1 | 1 | −1 |
| 431 | −1 | −1 | 1 | 1 | −1 | 1 | 1 | −1 | 1 | −1 | 1 | 1 | 1 | −1 | 1 | −1 |
| 432 | −1 | 1 | 1 | 1 | −1 | −1 | 1 | −1 | −1 | 1 | −1 | −1 | 1 | 1 | 1 | −1 |

TABLE 1-continued

| INDEX | CODE |
|---|---|
| 433 | −1 −1 1 1 1 1 1 1 1 1 1 1 1 1 −1 −1 |
| 434 | −1 −1 1 1 1 1 −1 1 1 −1 1 −1 1 1 −1 −1 |
| 435 | −1 −1 1 1 1 1 −1 −1 1 1 −1 −1 1 1 −1 −1 |
| 436 | −1 −1 1 1 1 −1 −1 1 1 −1 −1 1 1 1 −1 −1 |
| 437 | −1 −1 1 1 −1 −1 −1 −1 −1 −1 −1 −1 1 1 −1 −1 |
| 438 | −1 −1 1 1 −1 1 −1 1 1 −1 1 1 1 1 −1 −1 |
| 439 | −1 −1 1 1 −1 −1 1 1 −1 −1 1 1 1 1 −1 −1 |
| 440 | −1 −1 1 1 −1 1 1 −1 −1 1 1 −1 1 1 −1 −1 |
| 441 | −1 1 1 1 1 −1 1 1 1 1 −1 1 1 1 −1 1 |
| 442 | −1 −1 1 −1 1 −1 1 1 1 1 1 −1 1 −1 −1 −1 |
| 443 | −1 1 1 −1 1 −1 1 1 1 1 1 −1 1 1 −1 −1 |
| 444 | −1 −1 1 1 1 −1 −1 1 1 1 −1 −1 1 −1 −1 1 |
| 445 | −1 −1 1 −1 −1 −1 −1 1 −1 1 −1 −1 1 −1 −1 −1 |
| 446 | −1 1 1 1 −1 −1 1 −1 1 −1 1 −1 1 1 −1 1 |
| 447 | −1 −1 1 1 −1 1 1 −1 1 1 1 1 −1 1 −1 −1 |
| 448 | −1 1 1 −1 −1 −1 1 1 −1 1 1 −1 1 1 −1 −1 |
| 449 | 1 1 1 1 −1 1 1 −1 1 1 1 1 1 −1 −1 1 |
| 450 | 1 1 1 −1 −1 −1 1 −1 1 −1 1 1 1 −1 −1 −1 |
| 451 | 1 1 1 −1 −1 1 1 −1 1 1 −1 1 1 1 −1 −1 |
| 452 | 1 1 1 1 −1 −1 −1 1 −1 1 1 1 −1 1 −1 1 |
| 453 | −1 1 1 −1 −1 −1 −1 1 −1 −1 1 −1 −1 −1 −1 −1 |
| 454 | −1 1 1 1 −1 1 −1 1 1 1 −1 1 −1 −1 −1 1 |
| 455 | −1 1 1 1 −1 −1 1 1 1 1 1 1 −1 1 −1 1 |
| 456 | −1 1 1 −1 −1 1 1 −1 1 1 1 1 −1 −1 −1 −1 |
| 457 | 1 1 1 −1 −1 1 1 1 1 −1 1 1 1 1 −1 1 |
| 458 | 1 −1 1 −1 −1 1 1 −1 1 −1 1 −1 1 −1 −1 1 |
| 459 | 1 1 1 1 −1 1 1 −1 1 1 −1 −1 1 1 −1 1 |
| 460 | 1 −1 1 −1 −1 1 −1 1 1 −1 1 1 1 −1 −1 1 |
| 461 | −1 −1 1 −1 −1 1 −1 1 −1 1 −1 −1 1 −1 −1 1 |
| 462 | −1 1 1 −1 −1 1 −1 1 1 −1 1 −1 1 1 −1 1 |
| 463 | −1 −1 1 −1 1 1 1 1 1 1 1 1 −1 1 −1 1 |
| 464 | −1 1 1 −1 1 1 1 −1 1 1 1 −1 1 1 −1 −1 |
| 465 | 1 1 1 −1 −1 1 1 1 1 1 1 1 1 −1 1 1 |
| 466 | 1 1 1 −1 −1 −1 1 −1 1 −1 1 −1 1 −1 1 1 |
| 467 | 1 1 −1 −1 −1 1 1 −1 1 1 1 −1 1 1 −1 1 |
| 468 | 1 1 −1 −1 −1 1 1 −1 1 1 1 −1 1 1 −1 1 |
| 469 | −1 1 −1 −1 −1 1 −1 1 1 −1 1 −1 1 −1 −1 1 |
| 470 | −1 1 −1 1 −1 1 1 1 1 1 −1 1 −1 1 −1 1 |
| 471 | −1 1 −1 1 −1 1 1 −1 1 1 −1 1 −1 1 1 1 |
| 472 | −1 1 1 −1 1 1 1 −1 1 1 −1 1 −1 −1 1 1 |
| 473 | 1 1 1 1 −1 1 1 −1 1 −1 1 1 1 1 1 1 |
| 474 | 1 −1 1 −1 −1 1 1 −1 1 −1 1 1 −1 1 1 −1 |
| 475 | 1 1 −1 −1 1 1 1 −1 1 −1 1 1 1 1 −1 −1 |
| 476 | 1 −1 −1 1 1 1 1 −1 1 −1 1 1 1 1 −1 1 |
| 477 | −1 −1 −1 1 −1 1 1 −1 1 1 1 −1 1 −1 −1 −1 |
| 478 | −1 1 −1 1 −1 1 1 −1 1 1 1 −1 1 −1 1 1 |
| 479 | −1 −1 1 1 −1 1 1 −1 1 −1 1 −1 −1 1 1 1 |
| 480 | −1 1 1 −1 1 1 1 −1 1 −1 1 −1 1 1 1 −1 |
| 481 | −1 1 1 −1 1 1 1 1 1 −1 1 1 1 1 1 1 |
| 482 | −1 −1 1 −1 1 1 1 −1 1 −1 −1 −1 1 −1 1 1 |
| 483 | −1 1 −1 −1 1 1 −1 1 −1 −1 −1 1 1 −1 1 1 |
| 484 | −1 −1 −1 −1 1 1 1 1 1 1 1 1 1 −1 1 1 |
| 485 | −1 −1 −1 −1 1 −1 1 −1 −1 −1 −1 1 −1 1 −1 1 |
| 486 | −1 1 −1 −1 1 1 1 −1 −1 −1 1 1 1 −1 1 1 |
| 487 | −1 −1 1 −1 1 1 1 −1 −1 1 1 −1 1 1 1 1 |
| 488 | 1 1 1 1 1 1 1 1 1 1 1 1 1 1 1 1 |
| 489 | −1 1 1 1 1 1 −1 1 −1 1 1 −1 1 1 1 1 |
| 490 | −1 1 −1 1 −1 1 −1 1 −1 1 1 1 1 1 1 −1 |
| 491 | −1 1 −1 −1 1 1 −1 1 1 −1 1 1 −1 1 −1 −1 |
| 492 | −1 −1 1 1 −1 1 1 1 −1 1 1 1 1 −1 1 1 |
| 493 | −1 1 −1 1 −1 1 1 −1 −1 −1 1 1 −1 1 −1 −1 |
| 494 | −1 1 −1 1 1 1 −1 −1 1 1 1 1 1 −1 −1 1 |
| 495 | −1 1 1 1 −1 1 1 −1 −1 1 1 1 1 −1 1 1 |
| 496 | −1 1 −1 −1 1 1 1 −1 1 1 1 −1 1 −1 1 −1 |
| 497 | −1 −1 1 −1 1 1 1 −1 1 1 1 1 1 1 1 1 |
| 498 | −1 −1 1 1 1 1 1 −1 1 1 1 1 −1 −1 1 1 |
| 499 | −1 1 −1 1 1 −1 1 −1 1 1 1 1 −1 1 −1 1 |
| 500 | −1 −1 1 1 1 −1 1 −1 1 1 1 1 −1 1 −1 −1 |
| 501 | −1 −1 1 −1 1 1 −1 1 −1 −1 1 1 1 −1 −1 −1 |
| 502 | −1 1 1 1 1 −1 1 −1 −1 1 1 1 1 −1 1 1 |
| 503 | −1 −1 1 1 1 1 −1 −1 −1 −1 1 1 1 −1 −1 1 |
| 504 | −1 1 1 −1 −1 1 1 −1 1 −1 1 1 1 1 −1 −1 |
| 505 | −1 1 1 −1 1 1 1 1 1 1 1 1 −1 −1 1 1 |
| 506 | −1 1 1 −1 1 −1 1 −1 1 −1 1 −1 1 −1 −1 1 |
| 507 | −1 1 1 −1 1 1 −1 1 1 −1 1 −1 1 −1 −1 1 |
| 508 | −1 1 1 −1 1 −1 −1 1 1 −1 1 1 1 −1 −1 1 |
| 509 | −1 1 1 −1 −1 −1 −1 −1 −1 −1 −1 1 −1 1 −1 1 |
| 510 | −1 1 1 −1 −1 1 −1 1 −1 1 −1 1 1 −1 −1 1 |

TABLE 1-continued

| INDEX | CODE | | | | | | | | | | | | | | | |
|---|---|---|---|---|---|---|---|---|---|---|---|---|---|---|---|---|
| 511 | −1 | 1 | 1 | −1 | −1 | −1 | 1 | 1 | −1 | −1 | 1 | 1 | 1 | −1 | −1 | 1 |
| 512 | −1 | 1 | 1 | −1 | −1 | 1 | 1 | −1 | −1 | 1 | 1 | −1 | 1 | −1 | −1 | 1 |

Figure 4:
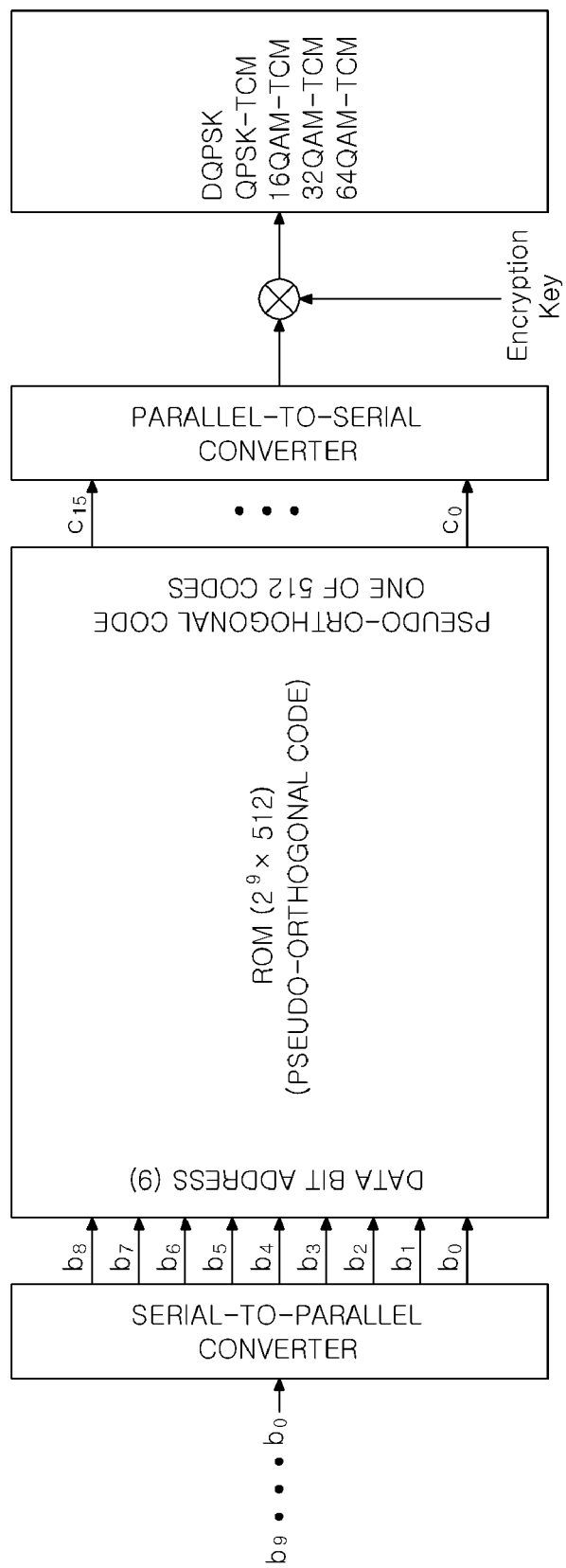
FIG. 4 is a block diagram of a pseudo-orthogonal modulation scheme.

FIG. 4 is a block diagram of the pseudo-orthogonal modulation scheme. Data to be transmitted are converted into 9-bit parallel data by a serial-to-parallel converter and the 9-bit parallel data are input to the 9 address pins of the ROM.

One of the 512 pseudo-orthogonal codes is selected and output according to the input of the addresses, that is, the values of the data to be transmitted. The selected pseudo-orthogonal code is converted into serial bits by a parallel-to-serial converter. An encryption key may be added to the output code in order to increase the security performance. The encryption key may be added before the data is encoded.

Figures 5, 6:
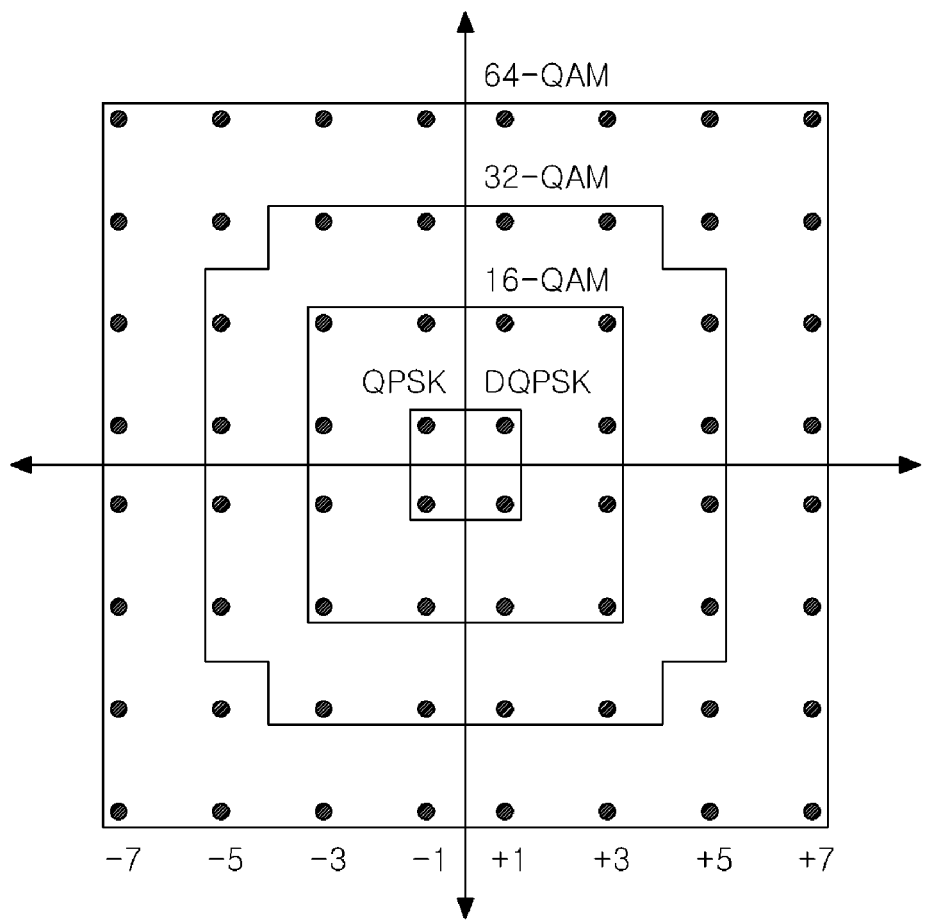
FIG. 5 is a table showing a relationship between a modulation scheme and a channel coding according to an embodiment of the present invention.
FIG. 6 is a signal constellation of modulation schemes.

As illustrated in FIG. 5, after the encoding, a signal modulation is performed using Differential Quadrature Phase Shift Keying (DQPSK), Quadrature Phase Shift Keying (QPSK), 16 Quadrature Amplitude Modulation (16QAM), 32QAM, or 64QAM according to a required data rate.

In view of the modulation scheme, QPSK is adopted as a basic modulation scheme, and a DQPSK is used in order to facilitate reception. In addition, 16/32/64QAM may be used together in order to variably transmission data at a high data rate.

FIG. 6 is a constellation diagram of a signal that is transmitted over an actual channel according to QPSK, DQPSK and 16/32/64QAM.

Upon the actual signal transmission, a normalization process is required to make the signals of all modulation schemes have the same mean power. For example, QPSK and DQPSK multiply "1", 16QAM multiplies "$1\sqrt{5}$", 32QAM multiplies "$1\sqrt{10}$", and 64QAM multiplies "$1\sqrt{21}$".

DQPSK is a modulation scheme that enables an asynchronous demodulation. If 2 bits to be transmitted are (0, 0), their phase is shifted by 0. If (0, 1), their phase is shifted by Π/2. If (1, 1), their phase is shifted by Π. If (1, 0), their phase is shifted by 3Π/2.

Figure 7:
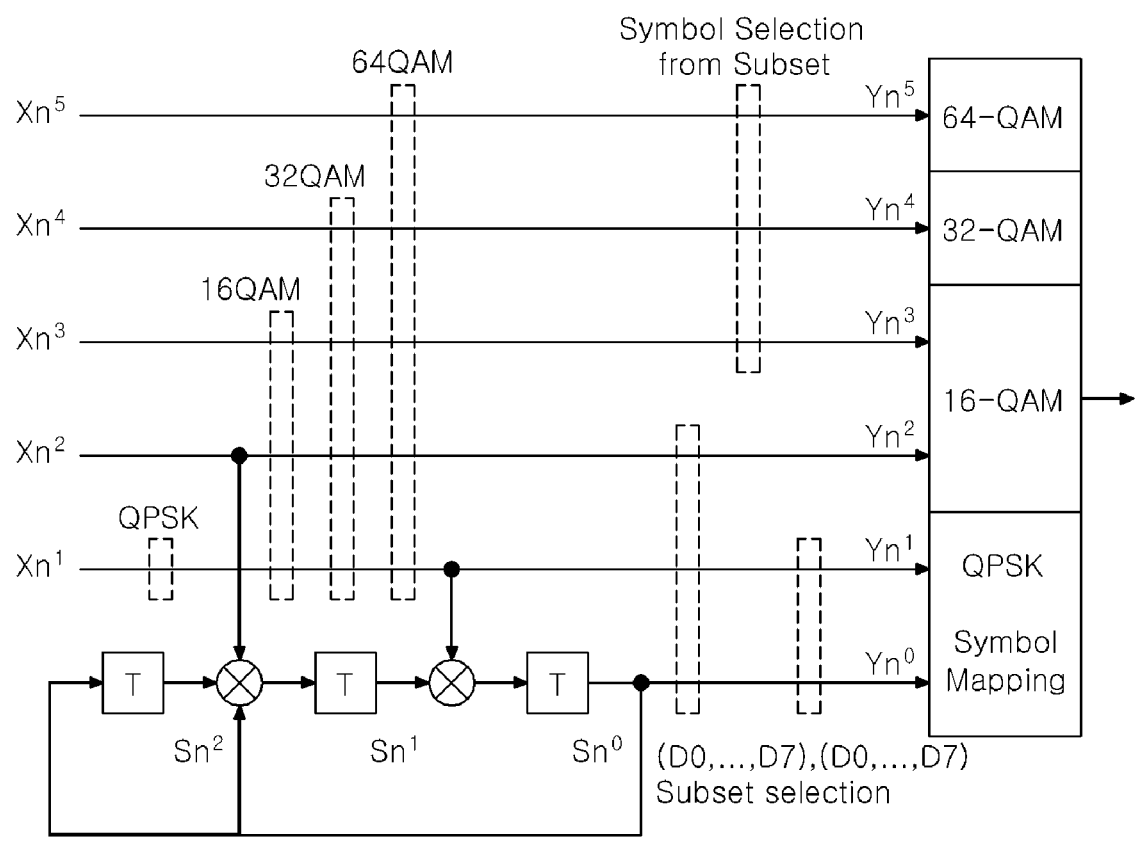
FIG. 7 illustrates a relationship between a modulation scheme and a TCM.

FIG. 7 illustrates a Trellis coding process of QPSK and 16/32/64QAM modulation schemes.

A Trellis Coded Modulation (TCM) is included for improving the performance of the transmitter and receiver according to the present invention. The TCM according to the present invention is combined with the above modulation schemes and their channel coding.

As illustrated in FIG. 7, pair of 6 bit streams encoded by 5 input bits, $([x_n^5, x_n^4, x_n^3, x_n^2, x_n^1], [y_n^5, y_n^4, y_n^3, y_n^2, y_n^1, y_n^0])$, is the input/output of a Trellis encoder has. When an output bit is 6, it is mapped into 64QAM symbol. Pair of 5 bit streams encoded by 4 input bits, $([x_n^4, x_n^3, x_n^2, x_n^1], [y_n^4, y_n^3, y_n^2, y_n^1, y_n^0])$, is mapped into 32QAM symbol. Pair of 4 bit streams encoded by 3 input bits, $([x_n^3, x_n^2, x_n^1], [y_n^3, y_n^2, y_n^1, y_n^0])$, is mapped into 16QAM symbol. Pair of 2 bit streams encoded by 1 input bit, $([x_n^1], [y_n^1, y_n^0])$, is mapped into QPSK symbol.

Figure 8:
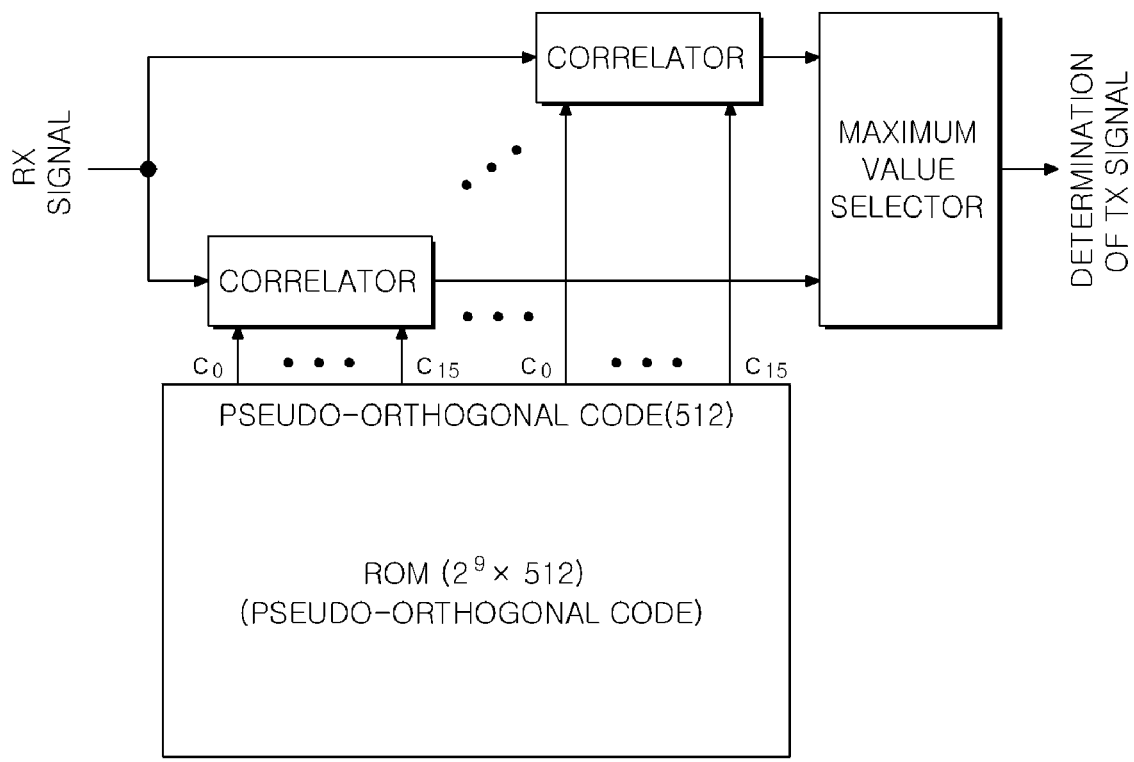
FIG. 8 illustrates a structure of a receiver using pseudo-orthogonal coding/decoding schemes according to an embodiment of the present invention.

FIG. 8 illustrates a structure of a receiver using a pseudo-orthogonal code scheme according to an embodiment of the present invention.

Referring to FIG. 8, the receiver includes a ROM, a correlator, and a maximum value selector in order to demodulate a transmission signal that is encoded according to a pseudo-orthogonal code.

The ROM stores 512 16-bit pseudo-orthogonal codes that are the same codes as the pseudo-orthogonal encoder according to the present invention. The ROM serves as a demodulator. Meanwhile, the pseudo-orthogonal codes have their indexes. The index values are the same as memory address values corresponding to the code values of the pseudo-orthogonal encoder of the transmitter.

The receiver further includes 512 correlators corresponding to the 512 pseudo-orthogonal codes output from the ROM. Each correlator receives one of the 512 pseudo-orthogonal codes and a signal received through a channel.

In order to demodulate the pseudo-orthogonal modulated signal in the receiving end, BPSK (or QPSK, etc.) demodulated signals are input to the correlators.

The correlators calculate correlation values by multiplying their pseudo-orthogonal codes. Among the correlation values of the correlators, only one value will be 1 and the others will be 0 in a noise-free state.

Therefore, the maximum value selector selects the maximum value among the correlation values, selects the index of the pseudo-orthogonal code corresponding to the maximum value, and converts the selected index into binary number. In this way, the original 9-bit transmission signal can be obtained.

That is, since the index value of each pseudo-orthogonal code is the same as the input address value of the encoder of the transmission system, it has the same value as the data bit transmitted by the transmission system. Thus, the original data bits can be obtained by binarizing the index of the pseudo-orthogonal code generating the maximum value selected by the maximum value selector of the reception system.

Since the above-described pseudo-orthogonal modulation system needs 16 bits in order to transmit a total of 9 bits, its spectrum efficiency is 0.5625. Therefore, the spectrum efficiency is remarkably improved compared with the orthogonal modulation.

According to the present invention, a pseudo-orthogonal code is obtained using coding schemes different from an existing orthogonal code scheme. Thus, much more data can be transmitted while using a code having the same length as an orthogonal code and obtaining a frequency spread gain.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A transmitter using pseudo-orthogonal code, comprising:
   a serial-to-parallel converter for converting serial transmission data into 9-bit parallel data; and a pseudo-orthogonal code memory for receiving the parallel data from the serial-to-parallel converter and outputting 16-bit pseudo-orthogonal code by using the parallel data as addresses, wherein the pseudo-orthogonal code memory is configured to generate an output code having a relationship to the input address as expressed in the following equation:

$$c(i)=0.5\times((-1)^{b_2\oplus(i_1\wedge b_1)\oplus(i_0\wedge b_0)}$$

$$(-1)^{b_5\oplus i_2\oplus(i_1\wedge b_4)\oplus(i_0\wedge b_3)}$$

$$(-1)^{b_8\oplus i_3\oplus(i_1\wedge b_7)\oplus(i_0\wedge b_6)}$$

$$(-1)^{\overline{(b_2\oplus b_5\oplus b_8)}\oplus i_3\oplus i_2\oplus(i_1\wedge(b_1\oplus b_4\oplus b_7))\oplus(i_0\wedge(b_0\oplus b_3\oplus b_6))})$$

where C(i) is a pseudo-orthogonal code value, i is each bit of the pseudo-orthogonal code, $0\leq i\leq 15$, and $b_0$-$b_8$ are a transmission data bit stream input in the memory as addresses.

2. The transmitter of claim 1, further comprising an encryption block for encrypting the output code of the pseudo-orthogonal code memory.

3. The transmitter of claim 1, further comprising an encryption block for encrypting the parallel data output from the serial-to-parallel converter.

4. The transmitter of claim 1, further comprising a modulator for modulating the output code of the pseudo-orthogonal code memory, wherein the modulator comprises:

a selector configured to select a modulation scheme; and a modulator configured to perform a modulation using one of DQPSK, QPSK, 16QAM, 32QAM, and 64QAM, which is selected by the selector.

* * * * *